United States Patent
Kozaki et al.

(10) Patent No.: US 7,564,670 B2
(45) Date of Patent: Jul. 21, 2009

(54) VACUUM PUMP

(75) Inventors: Junichiro Kozaki, Kyoto (JP); Masaki Ohfuji, Kyoto (JP); Nobuhiko Moriyama, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 178 days.

(21) Appl. No.: 11/790,977

(22) Filed: Apr. 30, 2007

(65) Prior Publication Data

US 2007/0278884 A1    Dec. 6, 2007

(30) Foreign Application Priority Data

May 9, 2006    (JP) .............................. 2006-129937
Apr. 2, 2007   (JP) .............................. 2007-096694

(51) Int. Cl.
*H01H 47/00*    (2006.01)
(52) U.S. Cl. ....................... 361/139; 361/143
(58) Field of Classification Search ............... 361/139, 361/143, 144; 310/90.5; 417/32, 44.1
See application file for complete search history.

(56) References Cited

FOREIGN PATENT DOCUMENTS

| JP | 07-005051 A | 1/1995 |
|---|---|---|
| JP | 2001-231238 A | 8/2001 |
| JP | 2004-144291 A | 5/2004 |
| JP | 2006-194094 A | 7/2006 |
| JP | 2006-308074 A | 11/2006 |

*Primary Examiner*—Danny Nguyen
(74) *Attorney, Agent, or Firm*—Sughrue Mion, PLLC

(57) ABSTRACT

A magnetic bearing system for use in a vacuum pump including a motor provided with a rotary blade. The magnetic bearing system including a rotary shaft rotationally holding said rotor, a motor for rotationally driving said rotary shaft, a magnetic levitation section for supporting said rotor relative to a stator through said rotary shaft in a non-contact manner, a rotation detection section for detecting a rotational speed of said rotor, a rotor-temperature detection section for detecting a temperature of said rotor; a carrier-wave generation section for supplying a common carrier wave to each of a plurality of sensors provided in said magnetic levitation section, said rotation detection section and said rotor-temperature detection section, and an A/D conversion section for sampling a sensor signal output from each of said sensors, in synchronization with said carrier wave.

20 Claims, 19 Drawing Sheets

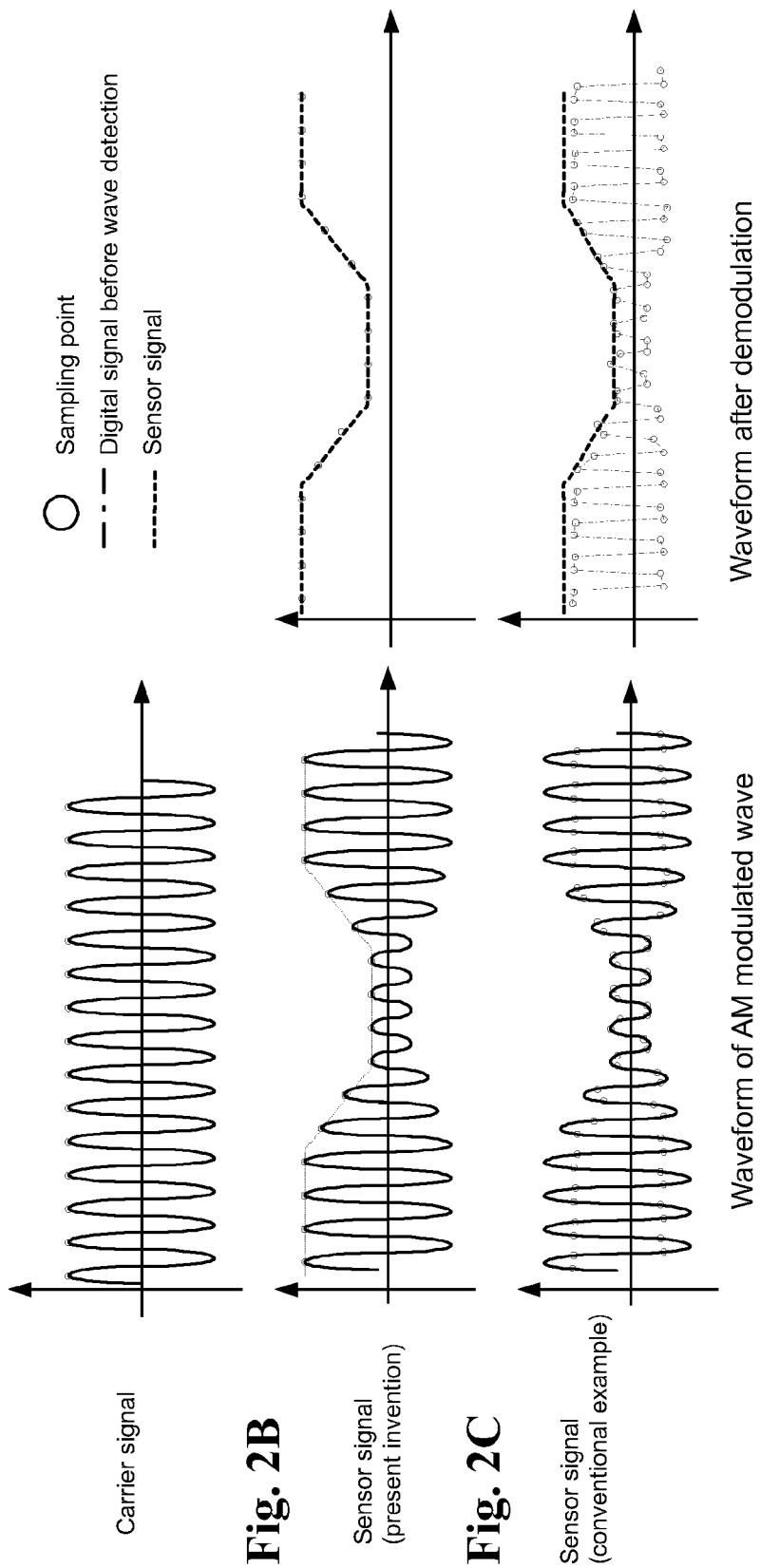

Output of rotation-sensing sensor

Output of rotor temperature-sensing sensor

Cumulative operation time

Cumulative operation time

VACUUM PUMP

BACKGROUND OF THE INVENTION

1. Field of the Invention

The present invention relates to a vacuum pump, such as a turbo-molecular pump, and more particularly to a magnetic bearing system for supporting a rotary shaft of a vacuum pump in a non-contact manner.

2. Description of the Related Art

In vacuum apparatuses, a suction or evacuation mechanism, such as a turbo-molecular pump, is used for sucking or evacuating gas from a vacuum vessel or the like to produce a vacuum therewithin. Generally, a turbo-molecular pump is equipped with a pump unit having a stator and a rotor, and designed to rotationally drive the rotor by an electrically-driven motor to suck/evacuate gas from a vacuum vessel or the like.

In most types of the vacuum pumps, such as a turbo-molecular pump, a rotary shaft rotationally holding the rotor is supported by a magnetic bearing system which comprises a position sensor and an electromagnet each installed between a pump casing and the rotary shaft. The position sensor includes a radial position sensor having a pair of sensor elements disposed opposed to each other across the rotary shaft in a radial direction of the rotary shaft. The electromagnet includes a radial-bearing electromagnet for rotatably supporting the rotor in the radial direction in a non-contact manner while being controlled based on radial position information sensed by the radial position sensor.

The rotary shaft has a lower end provided with a thrust target, and the position sensor further includes a thrust position sensor disposed opposed to the thrust target in a thrust direction of the rotary shaft. The thrust target has a rotor disc threadingly mounted thereon, and the electromagnet further includes a thrust-bearing electromagnet having a pair of electromagnet elements disposed opposed to each other across the rotor disc in the thrust direction. The thrust-bearing electromagnet is adapted to rotatably support the rotor in the thrust direction in a non-contact manner while being controlled by thrust-directional position information sensed by the thrust position sensor.

It is known to use a brushless DC motor as a motor for rotationally driving the rotor. For example, in case of using the brushless DC motor, the rotary shaft is provided with a permanent magnet of the motor, and a rotational position of the rotor is sensed to detect a position of a magnetic pole of the permanent magnet, i.e., a motor magnetic pole position. Then, an excitation pattern for use in exciting each stator coil of the motor is created based on the detected motor magnetic pole position, and the motor is controllably driven according to the excitation pattern.

A semiconductor element-based sensor such as a hall sensor, or an inductance sensor, is used as the rotational position sensor. For example, in case of using an inductance sensor, the thrust target is provided with a cutout, or a magnetic piece having a magnetic permeability different from that of a body of the thrust target, at a roatational position determined in conformity to the motor magnetic pole position, and the inductance sensor is arranged to sense an inductance change caused by the cutout or magnetic piece so as to detect the motor magnetic pole position (see, for example, Japan Patent Publication JP 2001-231238A).

As described above, the magnetic bearing system is designed to process sensor signals from various sensors so as to perform a magnetic bearing control, such as a levitation control of magnetically levitating and supporting the rotary shaft in a non-contact manner based on a magnetic levitation section, and a motor drive control based on a motor magnetic pole position detected by a rotation detection section, and provide a rotor temperature monitoring function according to a rotor-temperature detection section based on a Curie temperature of a temperature-detection magnetic segment.

In the conventional magnetic bearing system, the signal processing of the above sensor signals is performed using a plurality of signal processing circuits provided for the respective sensor signals.

FIG. 17 is an explanatory schematic diagram showing a vacuum pump equipped with a conventional magnetic bearing system, and FIG. 18 is an explanatory block diagram showing a control circuit of the conventional magnetic bearing system.

As shown in FIG. 17, the vacuum pump 6 comprises a motor-driven rotor 13 housed in a casing 10. The rotor 13 is provided with a plurality of rotary blades 14, and designed to be rotated to allow the rotary blades 14 to be rotationally moved at a high speed relative to a plurality of stationary blades 15 fixed to the casing 10 so as to suck gas from an inlet port 11 and discharge the gas from an outlet port 12 to evacuate gas molecules from a vacuum vessel (not shown) fluidically connected to the inlet port 11.

The vacuum pump 6 further includes a rotary shaft 16 coaxially fixed to the rotor 13 and adapted to be rotationally driven by a drive motor 20, such as a DC motor, so as to rotate the rotor 13. The drive motor 20 comprises a magnetic pole 21 mounted in the rotary shaft and a coil 22 fixed relative to the casing 10. The rotary shaft 16 is adapted to be supported by a radial bearing and a thrust bearing in a non-contact manner.

The radial bearing (X/Y-axial bearing) includes four radial-bearing electromagnets 31 (31a to 31d) each formed such that it is located across the rotary shaft 16, and four radial position sensors 30 (30a to 30d) each operable to sense a displacement of the rotary shaft 16 in one of four radial directions. In the levitation control, a current to be supplied to each of the radial-bearing electromagnets 31 is adjusted based on the displacement sensed by a corresponding one of the radial position sensors 30 to levitate the rotary shaft 16 at a predetermined position in the radial directions. In FIG. 17, two groups of radial bearings are disposed on vertically opposite sides of the drive motor 20, respectively.

The thrust bearing (Z-axial bearing) includes a pair of thrust-bearing electromagnets (Z-axis electromagnets) 41 disposed, respectively, on vertically opposite sides of a rotor disc 42a coaxially fixed to the rotary shaft 16, and a thrust position sensor 40 (Z-axis sensor) operable to sense a displacement of the rotary akis 16 in a thrust direction. In the levitation control, a current to be supplied to each of the thrust-bearing electromagnets 41 is adjusted based on the displacement sensed by the thrust position sensor 40 to levitate the rotary shaft 16 at a predetermined position in the thrust direction. In the vacuum pump illustrated in FIG. 17, a target member 2 is fixed to a lower end of the rotary shaft 16, and the thrust position sensor 40 (Z-axis sensor) is disposed in opposed relation to a central region of a bottom surface of the target member 2.

A rotation sensing sensor 23 is disposed in opposed relation to an outer peripheral region of the bottom surface of the target member 2. This rotation sensing sensor 23 is operable to sense a given pattern provided in the target member 2 so as to detect a phase position of the magnetic pole 21 mounted in the rotary shaft 16. In the motor drive control, the drive motor 20 is drivingly controlled based on the detected phase position of the magnetic pole.

In the control circuit of the magnetic bearing system illustrated in FIG. 18, the rotary shaft 16 is rotationally driven by the drive motor 20 which is controlled by a drive control section 102, and magnetically levitated by the radial bearing and the thrust bearing in a non-contact manner.

This control circuit of the magnetic bearing system includes a temperature detection section 60 and a rotation detection section 70. The temperature detection section 60 comprises a rotor temperature sensing sensor 60a, and rotor temperature detection means for detecting a rotor temperature based on a sensor signal output from the rotor temperature sensing sensor 60a. The rotor temperature sensing sensor 60a is operable to sense a temperature-dependent change in magnetic permeability of a temperature-detection magnetic segment mounted relative to the rotor and to send a sensor signal to the rotor temperature sensing sensor 60a, and the rotor temperature detection means 60c is operable to process the sensor signal so as to detect a rotor temperature from the permeability change and output a rotor temperature signal. The rotor temperature sensing sensor 60a is driven by carrier wave generation means 60b and is operable to output an AM modulated wave formed by modulating a carrier wave in accordance with the temperature of the temperature-detection magnetic segment.

The rotation detection section 70 comprises a rotation sensing sensor 70a, and rotation detection means 70c for detecting a rotor rotation based on a sensor signal output from the rotation sensing sensor 70a. When the motor is a brushless DC motor having a permanent magnet, the rotation sensing sensor 70a is operable to sense a position of a step, or a magnetic piece with a different magnetic permeability from that of a body of the target member 2, which is provided in the target member 2 at a position determined in conformity to a phase position of a magnetic pole of the permanent magnet of the motor and to send a sensor signal to the rotation detection means 70c. The rotation detection means 70c is operable to identify a magnetic pole position based on the sensor signal received from the rotation sensing sensor 70a and to output a signal indicative of a magnetic pole position. The rotation sensing sensor 70a is driven by carrier wave generation means 70b and operable to output an AM modulated wave formed by modulating a carrier wave with a rotation signal indicative of the sensed position.

As above, in the conventional magnetic bearing system, the signal processing of the sensor signals is performed using a plurality of signal processing circuits provided for the respective sensor signals. Thus, a size of the signal processing circuits becomes larger to cause an increase in cost.

As measures against this problem, it is contemplated to process the sensor signals by a single signal processing circuit.

In a control circuit designed to supply carrier signals to a plurality of sensors individually and asynchronously sample sensor signals, it is necessary to shorten a sampling interval of each sensor signal so as to accurately detect a moderation wave (i.e., sensed signal) from the sensor signal (i.e., moderated wave). The sampling interval can be shortened only if a carrier wave with a higher frequency is used, and a sampling operation is performed at a frequency at least two times greater than that of the carrier wave to meet the sampling theorem.

The high-speed sampling will lead to complexity in signal processing of each sensor signal and significant increase in data processing load. If the sampling interval is extended while keeping the carrier wave at a constant frequency, the signal processing load can be reduced, whereas the frequency of the carrier wave nonconforming to the sampling theorem will make it difficult to adequately extract each sensed signal from the sensor signals and accurately perform the magnetic bearing control such as the levitation control and the motor drive control, and the rotor temperature monitoring.

Moreover, the high-speed sampling requires a device capable of high-speed processing which leads to an increase in cost.

Further, the conventional magnetic bearing system has a problem about instability in a magnetic bearing control due to a temperature rise of a rotor assembly (i.e., rotor, rotary shaft, target member, rotor disc, etc.). FIGS. 19A to 19C are graphs for explaining relationships between a temperature rise of the rotor assembly and respective magnetic bearing control parameters. Each characteristic curve illustrated FIGS. 19A to 19C is one model for simplifying explanation, but not a curve indicative of an actual characteristic.

During operation of a turbo-molecular pump equipped with a magnetic bearing system, a rotor temperature will increase due to heat caused by the friction with evacuation gas, and heat from the motor when it is supplied with a large motor current. In response to an increase in rotor temperature, the rotor has a thermal expansion, and a gap between the rotor assembly and the position sensor is changed in a characteristic curve having a negative inclination, as shown in FIG. 19A. That is, the gap becomes smaller as the rotor temperature becomes higher (i.e., the gap is changed in a direction indicated by the arrow in FIG. 19A).

When the position sensor is an inductance type, it exhibits a characteristic curve having a negative inclination, as shown in FIG. 19B, in response to the change of the gap. That is, an output of the position sensor becomes higher as a distance of the gap becomes smaller (i.e., the output of the position sensor is changed in a direction indicated by the arrow in FIG. 19B). This output of the position sensor corresponds to sensitivity of the position sensor.

As shown in FIG. 19C, if the output of the position sensor becomes higher, a loop gain of the magnetic bearing control circuit is likely to be excessively increased to cause instability in the magnetic bearing control.

Due to the above relationship, the loop gain of the magnetic bearing control circuit becomes higher along with an increase in temperature of the rotor assembly to cause the problem about instability in the magnetic bearing control.

Further, if the vacuum pump is continuously operated even after the rotor is placed in a high-temperature state, resulting negative factors due to thermal expansion, such as permanent deformation and looseness in each portion of the rotor, are likely to cause a problem about occurrence of shaft vibration. This phenomenon becomes prominent along with an increase in a cumulative operation time of the vacuum pump operated when the rotor is in a high-temperature state.

SUMMARY OF THE INVENTION

In view of the above circumstances, it is an object of the present invention to provide a magnetic bearing system capable of facilitating reductions in size and cost of a signal processing circuit for processing each sensor signal.

It is another object of the present invention to provide a magnetic bearing system capable of suppressing instability in a magnetic bearing control due to a temperature rise of a rotor assembly.

In order to achieve the above objects, a magnetic bearing system of the present invention is fundamentally designed to drive each of a plurality of sensors provided in the system by a common carrier wave, and sample a sensor signal from each of the sensors in synchronization with the carrier wave while using a common circuit, so as to facilitate reductions in size and cost of a signal processing circuit.

Specifically, the present invention provides a magnetic bearing system for use in a vacuum pump designed to suck and discharge gas according to a rotation of a rotor provided with a rotary blade. The magnetic bearing system comprises a rotary shaft rotationally holding the rotor, a motor for rotationally driving the rotary shaft, a magnetic levitation section for supporting the rotor relative to a stator through the rotary shaft in a non-contact manner, a rotation detection section for detecting a rotational speed of the rotor, a rotor-temperature detection section for detecting a temperature of the rotor, a carrier-wave generation section for supplying a common carrier wave to each of a plurality of sensors provided in the magnetic levitation section, the rotation detection section and the rotor-temperature detection section, and an A/D conversion section for sampling a sensor signal output from each of the sensors, in synchronization with the carrier wave.

In the above magnetic bearing system of the present invention, each of the sensors provided in the magnetic levitation section, the rotation detection section and the rotor-temperature detection section is operable to receive the carrier wave generated by the carrier-wave generation section, and modulate the carrier wave with a sensed signal to form and output an AM moderated wave. A phase of each of the AM moderated waves, i.e., sensor signals, from the gap sensors, is determined on the basis on the common carrier wave supplied to the gap sensors.

Thus, as compared with the conventional magnetic bearing system where a carrier wave is supplied to each of a plurality of sensors independently and asynchronously, and therefore it is necessary to perform an asynchronous sampling requiring a relatively narrow sampling interval due to difficulty in identifying a phase relationship between respective AM modulated waves during a sampling operation of sensor signals output from the sensors, the magnetic bearing system of the present invention makes it possible to drive the plurality of sensors by the common carrier wave and fix a relative phase relationship between respective AM modulated waves. i.e., sensor signals output from the sensors.

In one embodiment of the present invention, the magnetic levitation section may include an electromagnet for magnetically levitating the rotor relative to the stator through the rotary shaft to support the rotor in a non-contact manner, and a levitated position-sensing gap sensor for sensing an inductance change which varies depending on a levitated position of the rotor relative to the stator. Further, the rotation detection section may include a rotation-sensing gap sensor for sensing an inductance change in a rotation-detection target mounted relative to the rotor; and the rotor-temperature detection section may include a rotor temperature-sensing gap sensor for sensing an inductance change in a temperature-detection magnetic segment mounted relative to the rotor. The temperature-detection magnetic segment may have a Curie temperature approximately equal to an allowable upper-limit temperature of a rotor component of the rotor.

In the above magnetic bearing system, each of the levitated position-sensing gap sensor, the rotation-sensing gap sensor and the rotor temperature-sensing gap sensor may be operable to modulate the carrier wave supplied from the carrier-wave generation section, in association with the inductance change sensed thereby, and the A/D conversion section may be operable to sample the modulated signal from each of the gap sensors, in synchronization with the carrier wave.

In an operation of detecting a signal relating to the temperature-detection magnetic segment, from the sensor signal output from the rotor temperature-sensing gap sensor, it is necessary to identify a phase position of the temperature-detection magnetic segment which is periodically sensed along with the rotation of the rotor. For this purpose, in a conventional magnetic bearing system it is necessary to memorize the rotational position of the temperature-detection magnetic segment, based on a detection signal in the rotation detection section or a sensed signal of a separate hall sensor provided in the motor.

Differently from this conventional magnetic bearing system, in another embodiment of the present invention, for the operation of identifying a position of the temperature-detection magnetic segment, the temperature-detection magnetic segment is disposed relative to the rotor in a predetermine phase relationship with the rotation-detection target mounted relative to the rotor. That is, the rotation-detection target and the temperature-detection magnetic segment are mounted relative to the rotor at respective positions with a predetermined phase relationship. This makes it possible to identify a phase position of the temperature-detection magnetic segment based on the sensor signal output from the rotation-sensing gap sensor. Alternatively, a comparable result may be obtained by measuring the phase positions of the temperature-detection magnetic segment and the rotation detection target in advance and performing timing correction accordingly.

In one embodiment of the present invention configured to meet the above phase relationship, the rotation detection target is provided with a step at a position corresponding to a rotational position of the rotor, and the temperature-detection magnetic segment is disposed at a position having a predetermined phase relationship with the step. This phase relationship between the temperature-detection magnetic segment and the step makes it possible to set the rotation detection target and the temperature-detection magnetic segment in a specific phase relationship. Further, when the motor is a brushless DC motor having a permanent magnet, the step portion may be disposed at a position corresponding to a magnetic pole position of the permanent magnet of the motor. This phase relationship between the temperature-detection magnetic segment and the step makes it possible to set the rotation detection target and the temperature-detection magnetic segment in a specific phase relationship.

In another embodiment of the present invention, the rotor-temperature detection section and the rotation detection section is configured as a single section. Specifically, the rotary shaft includes a magnetic-segment mounting member mounting therein the temperature-detection magnetic segment and having a step at a position corresponding to a magnetic pole position of the permanent magnet of the motor. That is, a step is provided in the magnetic-segment mounting member at a position corresponding to the motor magnetic pole position, together with the temperature-detection magnetic segment.

In the above embodiment, the rotor temperature-sensing gap sensor is disposed opposed to the magnetic-segment mounting member, to sense respective inductance changes caused by a temperature change of the temperature-detection magnetic segment and a gap change of the step to detect a rotor temperature and a rotational position of the rotor assembly (i.e., the rotor, the rotary shaft, the rotation-detection target, the magnetic-segment mounting member, etc.). Further, when the motor is a brushless DC motor having a permanent magnet, a magnetic pole position of the permanent magnet of the motor can also be detected to perform a motor drive control.

As measures for suppressing instability in a magnetic bearing control due to a temperature rise of the rotor assembly, the magnetic bearing system of the present invention may be configured as follows.

As a first one of the measures, the magnetic bearing system is designed to change a loop gain of the magnetic bearing control circuit depending on a rotor temperature signal indicative of the detected rotor temperature and/or a cumulative operation time of the vacuum pump operated when the rotor is in a high-temperature state (i.e., cumulative high-temperature operation time). As a second one of the measures, the magnetic bearing system is designed to change a sensor sensitivity depending on the rotor temperature signal and/or the cumulative high-temperature operation time.

In a first control strategy for the magnetic bearing system designed to change a loop gain of the magnetic bearing control circuit, the loop gain may be changed depending on the rotor temperature signal.

Specifically, the first control strategy may include a control section adapted to receive a displacement signal from the A/D conversion section and output a control signal to the magnetic levitation section so as to form a magnetic bearing control circuit. The control section is operable to change the loop gain of the magnetic bearing control circuit depending on the rotor temperature signal. In the operation of changing the loop gain, the control section may be operable to change the loop gain according to a characteristic curve with a negative inclination relative to the rotor temperature signal. For example, the loop gain is set at a relatively high value when the rotor temperature signal has a relatively low value, and set at a relatively low value when the rotor temperature signal has a relatively high value.

In this manner, when the rotor assembly has a relatively high temperature, the loop gain can be lowered to suppress instability in the magnetic bearing control.

In a second control strategy for the magnetic bearing system designed to change a loop gain of the magnetic bearing control circuit, the loop gain may be changed depending on the cumulative high-temperature operation time. Specifically, the second control strategy may include a control section adapted to receive a displacement signal from the A/D conversion section and output a control signal to the magnetic levitation section so as to form a magnetic bearing control circuit. The control section is provided with a counter for cumulatively adding an operation time of the vacuum pump operated under a condition that the detected rotor temperature is greater than a predetermined temperature, and operable to change the loop gain of the magnetic bearing control circuit depending on a cumulative operation time added by the counter. In the operation of changing the loop gain, the control section may be operable to change the loop gain according to a characteristic curve with a negative inclination relative to the cumulative operation time. For example, the counter cumulatively adds a time period in which the vacuum pump is operated under a condition that the detected rotor temperature is greater than 120° C. Then, when the cumulative value becomes greater than a predetermined threshold, the loop gain is changed and set to/at a desired value depending on a level of the excess.

In a third control strategy for the magnetic bearing system designed to change a loop gain of the magnetic bearing control circuit, the first control strategy and the second control strategy may be combined together. Specifically, the third control strategy may include a control section provided with a counter for cumulatively adding an operation time of the vacuum pump operated under a condition that the detected rotor temperature is greater than a predetermined temperature. The control section is operable to change a loop gain of the magnetic bearing control circuit, depending on the rotor temperature signal and a cumulative operation time added by the counter.

In the second measure, the magnetic bearing system is designed to change a sensitivity of the sensor for sensing the levitation position. Specifically, this control strategy may include a control section operable to change a level of a displacement signal depending on the rotor temperature signal so as to change the sensitivity of the sensor. The control section may be operable to change the displacement signal according to a characteristic curve with a negative inclination relative to the rotor temperature signal. For example, the displacement signal is set at a relatively high level when the rotor temperature signal has a relatively low value, and set at a relatively high value when the rotor temperature signal has a relatively high value.

As above, the magnetic bearing system of the present invention can process a plurality of sensor signals on the basis of and in synchronization with a common carrier wave to allow a common signal processing circuit to be used for the sensor signals so as to facilitate reductions in size and cost of the signal processing circuit.

In addition, the magnetic bearing system of the present invention can suppress instability in the magnetic bearing control due to a temperature rise of the rotor assembly.

These and other objects, features, and advantages of the present invention will become apparent upon reading the following detailed description along with the accompanying drawings.

BRIEF DESCRIPTION OF THE DRAWINGS

FIGS. 2A to 2C are waveform charts for explaining a sampling operation of a sensor signal to be performed in synchronization with a carrier wave.

DESCRIPTION OF THE EXEMPLARY EMBODIMENTS

With reference to the drawings, an exemplary embodiment of the present invention will now be described.

Figure 1:
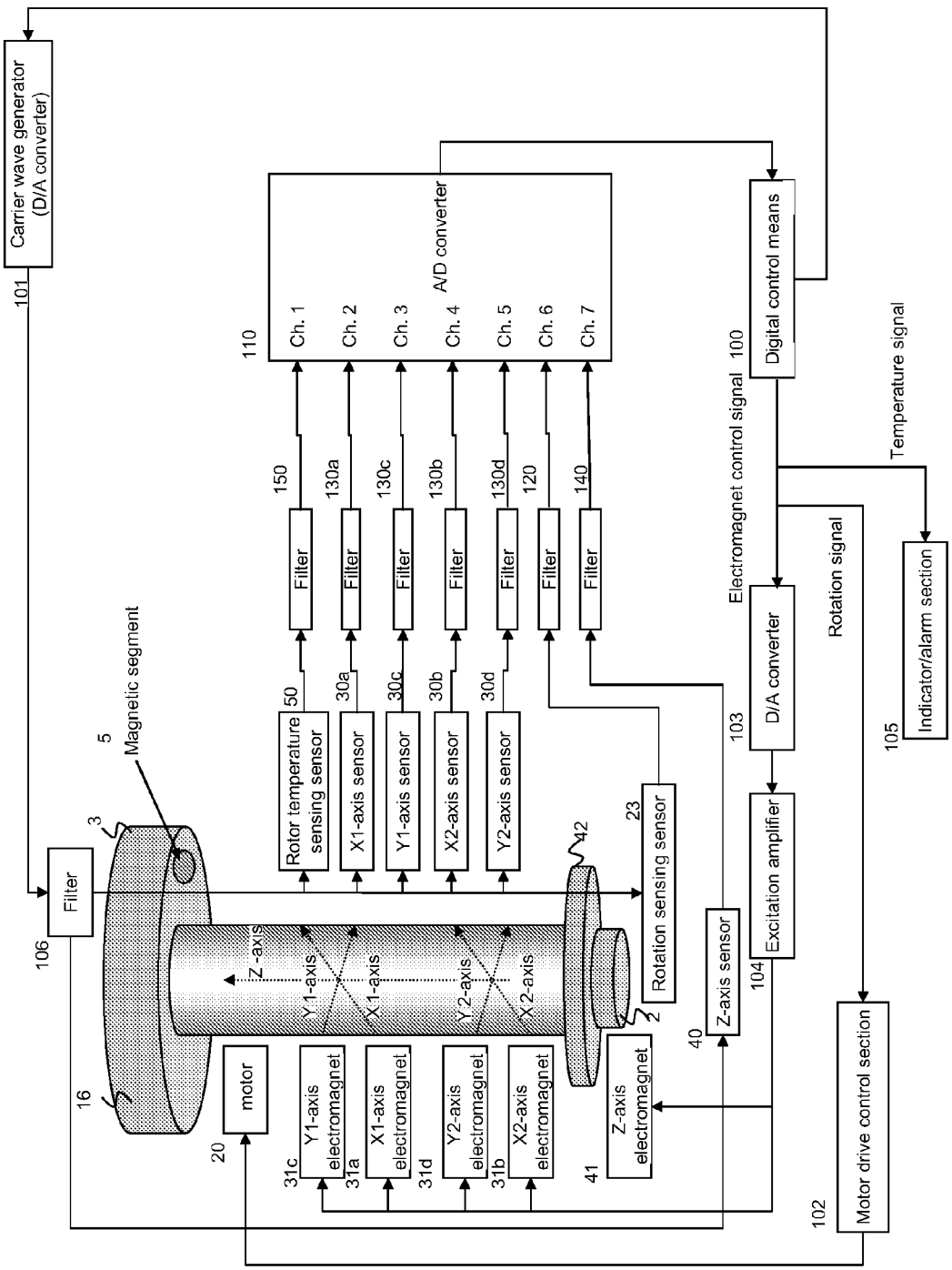
FIG. 1 is a block diagram showing a control circuit of a magnetic bearing system according to the present invention.
Figure 18:
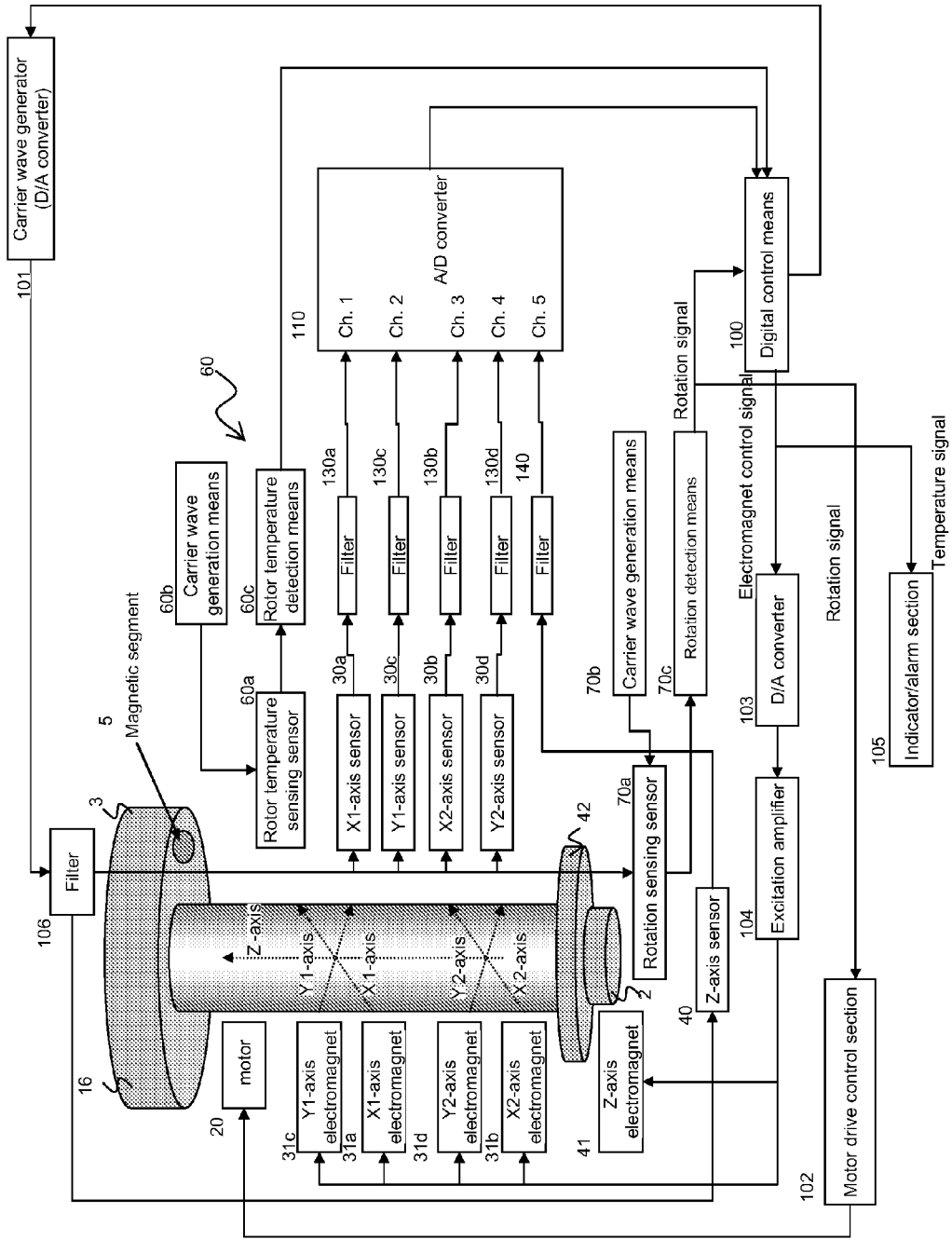
FIG. 18 is a block diagram showing a control circuit of the conventional magnetic bearing system.
Figure 19A:
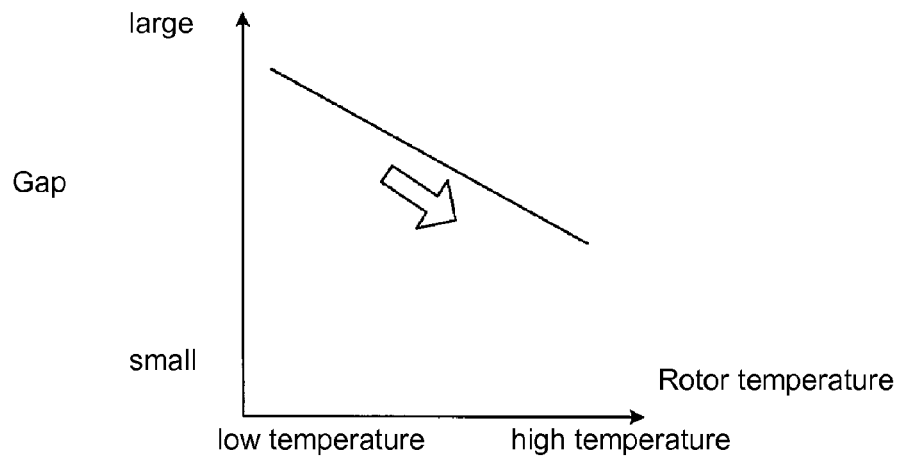
FIGS. 19A to 19A are graphs for explaining a relationship between a temperature rise in a rotor assembly and a magnetic bearing control.
Figure 19B:
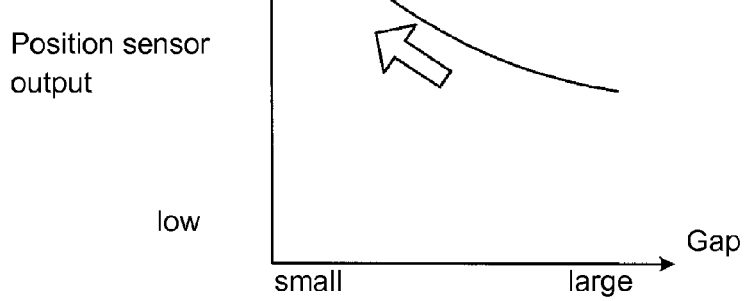
Figure 19C:
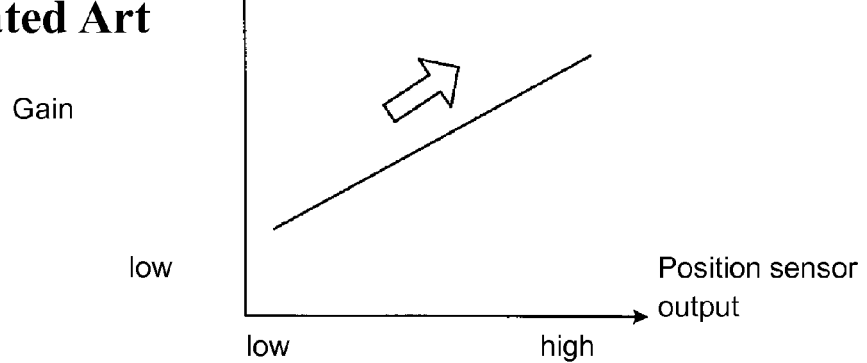

FIG. 1 is a block diagram showing a control circuit of a magnetic bearing system according the present invention. In FIG. 1, only a part of the control circuit relating to the present invention is illustrated, and the remaining part is omitted. Further, the same element or component as that in FIG. 18 is defined by the same reference numeral or code, and a reduplicated description thereabout will be fundamentally omitted.

With reference to FIGS. 2A to 10, a control circuit of the magnet bearing system according to the present invention will be described which is designed to drive a plurality of sensors provided in the magnetic bearing system by a common carrier wave and sample respective sensor signals from the sensors in synchronization with the carrier wave so as to facilitate lowering of a sampling frequency and use of a common signal processing circuit. Then, with reference to FIGS. 11 to 15, a control strategy for the magnet bearing system according to the present invention will be described which is designed to suppress instability in a magnetic bearing control due to a temperature rise of a rotor assembly. FIG. 1 shows a common part of the control circuit of the magnet bearing system according to the present invention.

Figure 17:
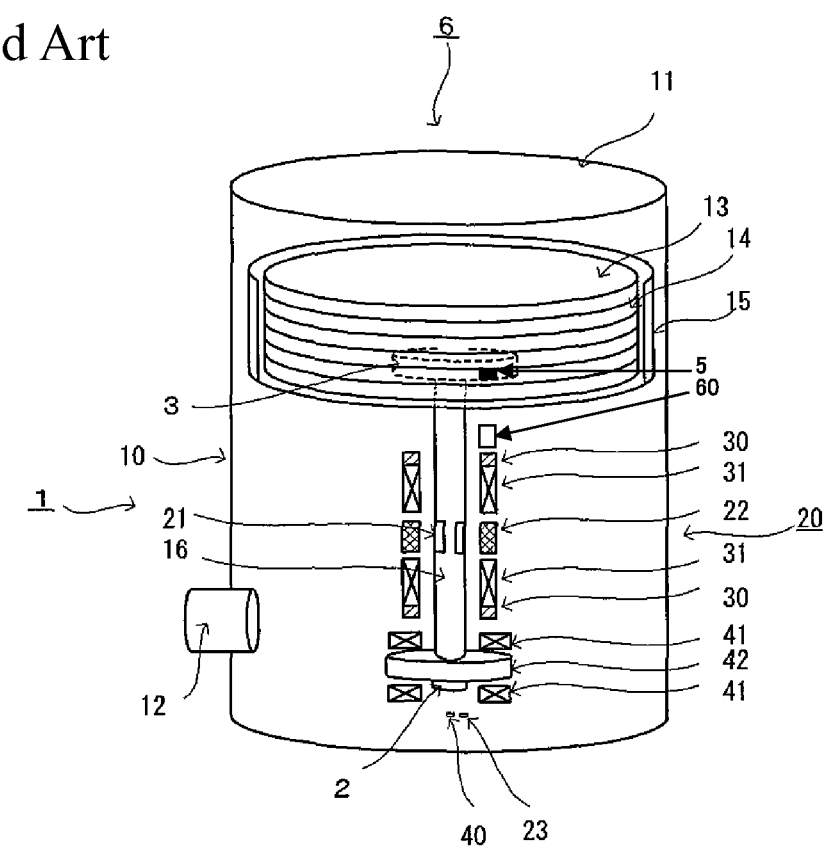
FIG. 17 is a schematic diagram showing a vacuum pump equipped with a conventional magnetic bearing system.

Referring to FIG. 1, a rotation sensing sensor 23 is operable to sense a rotation of a rotor (see FIG. 17). When a drive motor 20 is a brushless DC motor having a permanent magnet, a target member 2 is provided with a step, or a magnetic piece having a different magnetic permeability from that of a body of the target member 2, at a position determined in conformity to a phase position of a magnetic pole of the permanent magnet of the motor 20, and the rotation sensing sensor 23 is operable to sense the step or the magnetic piece. A sensed signal of the rotation sensing sensor 23 is passed through a filter 120 to remove a noise component therefrom, and sent to an A/D converter 110. The filtered signal is converted into a digital signal through the A/D converter 110, and sent to digital control means 100.

The digital control means 100 is operable, based on a rotational position of a rotary shaft 16 received from the A/D converter 110, to generate a rotation signal for controllably driving the drive motor 20. A phase of the rotational position of the rotor corresponds to a phase of the step or the magnetic piece, and therefore a phase of the rotation signal generated based on the rotational position of a rotary shaft 16 sensed by the rotation sensing sensor 23 corresponds to the phase of the rotational position of the rotor.

Further, when the motor 20 is a brushless DC motor having a permanent magnet, a phase position of the step or the magnetic piece of the target member corresponds to a phase position of the motor magnetic pole, and therefore the phase of the rotation signal generated based on the rotational position of a rotary shaft 16 sensed by the rotation sensing sensor 23 corresponds to the phase of the motor magnetic pole.

Thus, based on the rotation signal, a motor drive control section 102 can generate a drive current in conformity to the phase of the magnetic pole of the drive motor 20.

A radial bearing (X/Y-axial bearing) comprises a radial-bearing electromagnet 31 formed such that it is located across a rotary shaft 16, and a radial position sensor 30 operable to sense a displacement of the rotary shaft 16 in a radial direction. The radial-bearing electromagnet 31 includes an X1-axis electromagnet 31a, an X2-axis electromagnet 31b, a Y1-axis electromagnet 31c and a Y2-axis electromagnet 31d, and the radial position sensor 30 includes an X1-axis sensor 30a, an X2-axis sensor 30b, a Y1-axis sensor 30c and a Y2-axis sensor 30d. In a levitation control, a current to be supplied to the radial-bearing electromagnet 31 is adjusted based on the displacement sensed by the radial position sensor 30 to levitate the rotary shaft 16 at a predetermined position in the radial directions.

Each of sensor signals from the X1-axis sensor 30a, the X2-axis sensor 30b, the Y1-axis sensor 30c and the Y2-axis sensor 30d is passed through a corresponding one of filters 130a to 130d to remove a noise component therefrom, and sent to the A/D converter 110. The filtered signal is converted into a digital signal through the A/D converter 110, and sent to the digital control means 100.

The digital control means 100 is operable, based on the radial displacements of the rotary shaft 16 received from the A/D converter 110, to generate an electromagnet control signal for controllably driving the electromagnets 31a to 31d in such a manner as to support the rotary shaft 16 at a central position, and send the electromagnet control signal to a D/A converter 103.

The D/A converter 103 is operable, in response to receiving the electromagnet control signal from the digital control means 100, to convert the electromagnet control signal into an analog signal, and send the analog signal to an excitation amplifier 104. The excitation amplifier 104 is operable, based on the electromagnet control signal received from the D/A converter 103, to generate drive currents for driving the respective electromagnets 31a to 31d, and supply the drive currents to the respective electromagnets 31a to 31d.

A thrust bearing (Z-axial bearing) comprises a pair of thrust-bearing electromagnets (Z-axis electromagnets) disposed, respectively, on vertically opposite sides of a rotor disc 42 coaxially fixed to the rotary shaft 16, and a thrust position sensor 40 (Z-axis sensor) for sensing a thrust-directional displacement of the rotary axis 16. In the magnetic bearing control, a current to be supplied to each of the thrust-bearing electromagnets 41 is adjusted based on the displacement sensed by the thrust position sensor 40 to levitate the rotary shaft 16 at a predetermined position in the thrust direction.

A sensor signal from the Z-axis sensor 40 is passed through a filter 140 to remove a noise component therefrom, and sent to the A/D converter 110. The filtered signal is converted into a digital signal through the A/D converter 110, and sent to the digital control means 100.

The digital control means 100 is operable, based on the thrust-directional displacement of the rotary shaft 16 received from the A/D converter 110, to generate an electromagnet control signal for controllably driving the electromagnet 41 in such a manner as to support the rotary shaft 16 at a predetermined vertical position and send the electromagnet control signal to a D/A converter 103. The D/A converter 103 is operable, in response to receiving the electromagnet control signal from the digital control means 100, to convert the electromagnet control signal into an analog signal, and send the analog signal to the excitation amplifier 104. The excitation amplifier 104 is operable, based on the electromagnet control signal received from the D/A converter 103, to generate a drive current for driving the electromagnet 41, and supply the drive current to the electromagnet 41.

The rotary shaft 16 includes a mounting member 3 provided with a temperature-detection magnetic segment 5 having a temperature characteristic. For example, a plurality of temperature-detection magnetic segment 5 each having a different Curie temperature may be provided. A temperature of the rotor held by the rotary shaft 16 (see FIG. 17) provided with the temperature-detection magnetic segment can be detected by sensing an inductance change in the temperature-detection magnetic segment.

A rotor temperature-sensing sensor 50 is installed on the side of the stator at a position opposed to the temperature-detection magnetic segment 5 mounted in the mounting member 3.

A sensor signal from the rotor temperature-sensing sensor 50 is passed through a filter 150 to remove a noise component therefrom, and sent to the A/D converter 110. The filtered signal is converted into a digital signal through the A/D converter 110, and sent to the digital control means 100.

The digital control means 100 is operable, based on the sensor signal of the rotor temperature-sensing sensor 50 received from the A/D converter 110, to generate a rotor temperature signal and send the rotor temperature signal to an indicator or alarm section 105.

In the magnetic bearing system 1 according to the present invention, the radial position sensor 30 (X1-axis sensor 30*a*, X2-axis sensor 30*b*, Y1-axis sensor 30*c* and Y2-axis sensor 30*d*), the thrust position sensor 40 (Z-axis sensor) and the rotor temperature-sensing sensor 50 are driven by a common carrier wave.

A carrier wave generator 101 is operable to generate a carrier wave, for example, by driving a D/A converter based on a control signal from the digital control means 100. The carrier wave is passed through a filter 106 to remove a noise component therefrom, and send to each of the sensors so as to drive each of the sensors. The sensors driven by the common carrier wave can provide sensor signals which are synchronous with each other, i.e., have a fixed phase relationship.

The A/D converter 110 is operable to receive from the carrier wave generator 101 a synchronization signal synchronous with the carrier wave, and sample each of the sensor output signals received through the filters 120, 130*a* to 130*d*, 140, 150, based on the synchronization signal.

FIGS. 2A to 2C are waveform charts for explaining a sampling operation to be performed in synchronization with a carrier wave, wherein: FIG. 2A shows a carrier signal; FIG. 2B shows a sampling operation for a sensor signal from the rotation-sensing sensor in the present invention; and FIG. 2C shows one conventional example of an asynchronous sampling operation performed at shorter intervals than carrier wave cycles.

A sensor signal illustrated in FIG. 2B is driven by the carrier wave illustrated in FIG. 2A, and therefore can be formed in synchronization with the carrier. This sensor signal can be sampled in synchronization with the carrier wave to extract a digitized sensor detection signal without the need for demodulation.

On the contrary, in the case illustrated in FIG. 2C, as the asynchronous sampling operation is performed at short intervals, demodulation is necessary.

In the magnetic bearing system according to the present invention, the rotation-detection target and the temperature-detection magnetic segment are mounted relative to the rotor at respective positions with a predetermined phase relationship. This makes it possible to identify a phase position of the sensor output signal of the rotor temperature-sensing gap sensor, based on a phase position of the sensor signal of the rotation-sensing gap sensor. Alternatively, a comparable result may be obtained by measuring the phase positions of the temperature-detection magnetic segment and the rotation detection target in advance and performing timing correction accordingly.

Figure 3A:
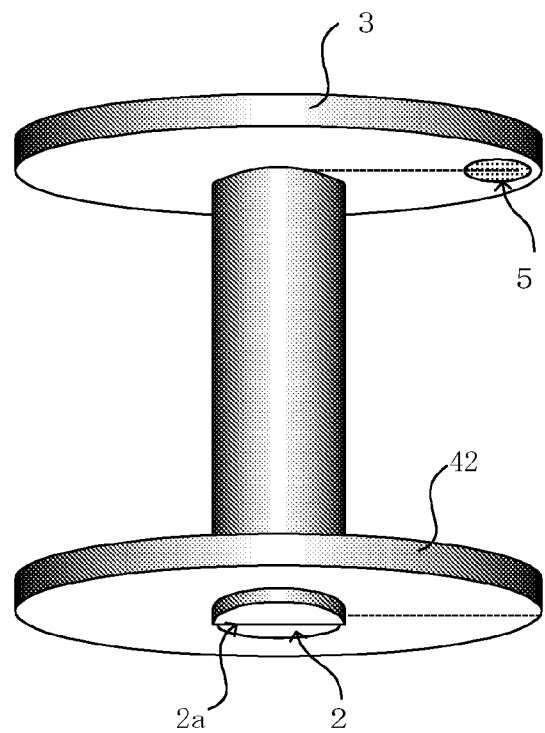
FIGS. 3A and 3B are schematic diagrams showing a relationship between respective phase positions of a rotation detection target and a temperature-detection magnetic segment.
Figure 3B:
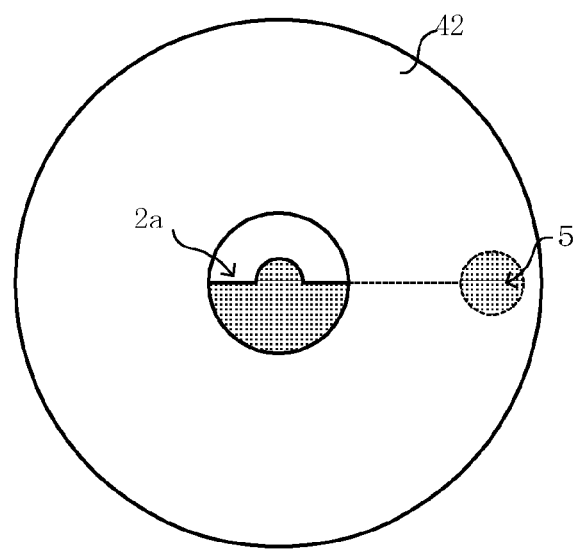
Figure 4A:
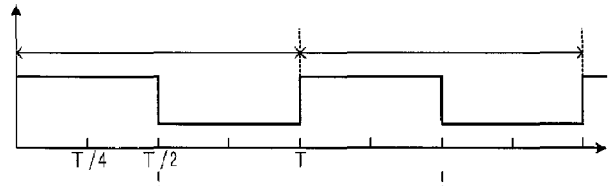
FIGS. 4A and 4B are waveform charts showing a relationship between respective phase positions of the rotation detection target and the temperature-detection magnetic segment.
Figure 4B:

FIGS. 3A, 3B and FIG. 4 explain the phase relationship between the phase positions of the rotation detection target and the temperature-detection magnetic segment.

In FIGS. 3A and 3B, the temperature-detection magnetic segment 5 and the rotation-detection target member 2 are provided, respectively, in the mounting member 3 and the rotor disc 42 which are coaxially fixed to the rotary shaft, to form a rotary shaft assembly. FIG. 3A is a perspective view of the rotary shaft assembly, and FIG. 3B is a bottom view of the rotary shaft assembly, as seen from the side of the rotor disc 42 in an axial direction of the rotary shaft.

The target member 2 may have a step 2*a*, i.e., a stepped configuration having a height which varies depending on a rotation angle, and the step 2*a* allows a distance between the target member 2 and the rotation-sensing sensor to be changed depending on a rotational position of the rotary shaft. Specifically, the step 2*a* of the target member 2 illustrated in FIGS. 3A and 3B is formed to provide two horizontal surfaces (i.e., convex and concave surfaces) divided by a step line radially extending across a rotational center of the rotary shaft assembly, i.e., the rotor, to have different heights, respectively. The rotation-sensing sensor is operable to sense an inductance change caused by a change in distance to the target member 2 due to the step 2*a*, so as to detect a rotation angle of 180 degrees. An angular position of the step line of the step 2*a* can be set to conform to a phase position of the magnetic pole of the motor to detect the motor magnet pole position based on an intensity of a sensor signal from the rotation-sensing sensor.

FIG. 4A shows a sensor signal of the rotation-sensing sensor obtained when the step 2*a* is formed to provide the convex surface in an angular range of zero to T/2, and the concave surface in an angular range of T/2 to T, wherein T is a period of a 360-degree rotation. For example, the step 2*a* may be formed to allow a rising edge (angular position: T/2) or a falling edge (angular position: T) of the sensor signal of the rotation-sensing sensor to conform to the motor magnetic pole position. In this case, the motor magnetic pole position can be identified from the rising or falling edge of the sensor signal from the rotation-sensing sensor.

Returning to FIGS. 3A and 3B, the temperature-detection magnetic segment 5 has a temperature-dependent characteristic, for example, a given Curie temperature. This Curie temperature may be approximately equal to an allowable upper-limit temperature of a rotor component of the rotor. The rotor temperature-sensing sensor is operable to sense a temperature-dependent inductance change in the magnetic segment 5 so as to detect a rotor temperature. Preferably, a plurality of magnetic segments 5 each having a different Curie temperature may be arranged at given angular positions along a circumferential direction of the mounting member 3. In this case, the rotor temperature-sensing sensor is operable to sense an inductance change in each of the magnetic segments 5 along with an increase in rotor temperature. Then, it is identified from which of the magnetic segments 5 the inductance change is sensed, to detect the rotor temperature based on a temperature-dependent characteristic of the identified magnetic segment 5.

An angular position of the magnetic segment 5 relative to the rotor can be identified based on a sensor signal from the rotation-sensing sensor. For example, in an arrangement where an angular position of the step line of the step 2a, i.e., a border line causing a change in height of the target member 2, is set to conform to an angular position of the magnetic segment 5, as shown in FIGS. 3A and 3B, an angular position of a falling edge in a sensor signal of the rotation-sensing sensor may be used as an angular reference mark, to detect the rotor temperature based on a sensor signal of the rotor temperature-sensing sensor at a time when the falling edge is detected.

For example, a relationship between respective angular positions of the step line of the step 2a and the magnetic segment 5 is figured out in advance, and a timing of the above detection of a sensor signal of the rotation-sensing sensor may be corrected on the basis of the relationship to appropriately adjust a phase relationship between the step 2a and the magnetic segment 5.

In the magnetic bearing system according to the present invention, the magnetic-segment mounting member mounting therein the temperature-detection magnetic segment 5 may be provided with a step at a position corresponding to the motor magnetic pole position, to allow a rotor-temperature detection section and a rotation detection section to be integrated into a single section.

FIGS. 5A to 6B show two examples of the integration of the rotor-temperature detection section and the rotation detection section. FIG. 7 shows an example of a sensor signal of the rotation-sensing sensor in these examples, wherein a phase relationship between the rotation-detection target member and the temperature-detection magnetic segment is illustrated.

Figure 5A:
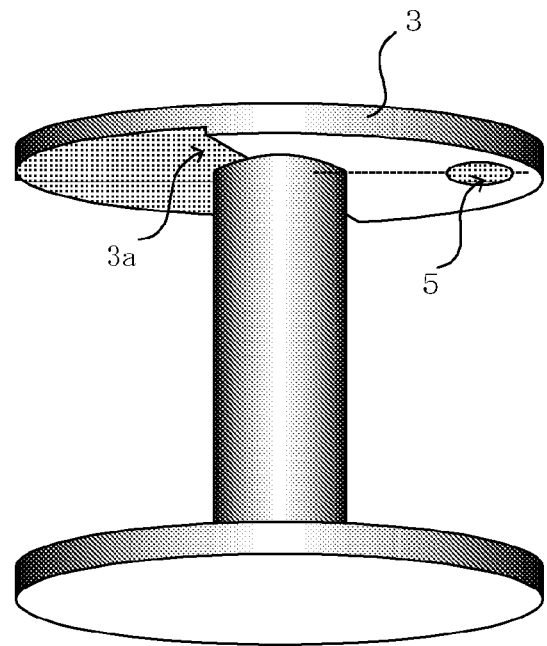
FIGS. 5A and 5B are schematic diagrams showing one example of an integrated structure of the rotation detection target and the temperature-detection magnetic segment.
Figure 5B:
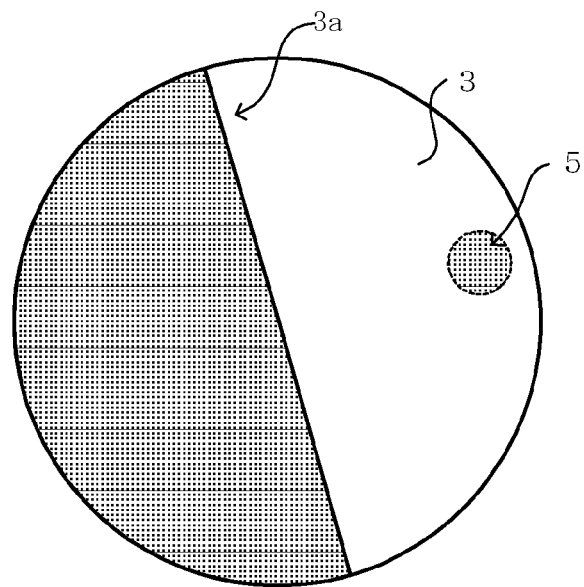

FIG. 5A and 5B show one example where the rotation detection section is incorporated in the rotor-temperature detection section. Specifically, a rotation-detection step 3a is provided in the magnetic-segment mounting member 3 mounting therein the temperature-detection magnetic segment 5. This step 3a is arranged at an angular position corresponding to the motor magnetic pole position, as with the aforementioned step 2a.

In this example, a rotor temperature-sensing gap sensor (not shown) is disposed opposed to the magnetic-segment mounting member 3 to sense an inductance change in the magnetic segment so as to detect a rotor temperature, and sense an inductance change in the step 3a so as to detect a rotational position of the rotor assembly to identify the motor magnetic pole position.

A sensor signal of the rotor temperature-sensing gap sensor includes both a signal component generated by the step and a signal component generated by the magnetic segment. Thus, it is necessary to discriminate between the two signal components. Each of the two signal components can be identified based on a difference in waveform therebetween. For example, as indicated by the reference codes A, B in FIG. 7, the signal component generated by the step appears as a rising or falling edge in a waveform of the sensor signal. Differently, as indicated by the reference code C in FIG. 7, the signal component generated by the magnetic segment appears as a peak in the waveform depending on a magnetic permeability or shape of the magnetic segment.

The waveform illustrated in FIG. 7 is obtained when the magnetic segment 5 is mounted in a convex surface of the step 3a, i.e., a surface closer to the rotor temperature-sensing gap sensor, and therefore the peak C generated by the magnetic segment appears on a High level region of the sensor signal from the rotation-detection gap sensor. The position of the magnetic segment 5 is not limited to the convex surface in this example, but the magnetic segment 5 may be mounted in a concave surface of the step 3a, i.e., a surface farther away from the rotor temperature-sensing gap sensor. In this case, a peak generated by the magnetic segment appears on a Low level region of a sensor signal from the rotation-detection gap sensor.

Figure 6A:
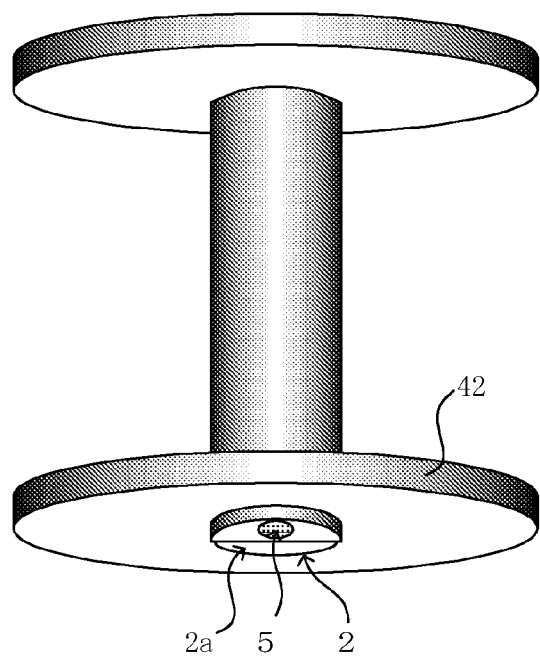
FIGS. 6A and 6B are schematic diagrams showing another example of the integrated structure of the rotation detection target and the temperature-detection magnetic segment.
Figure 6B:
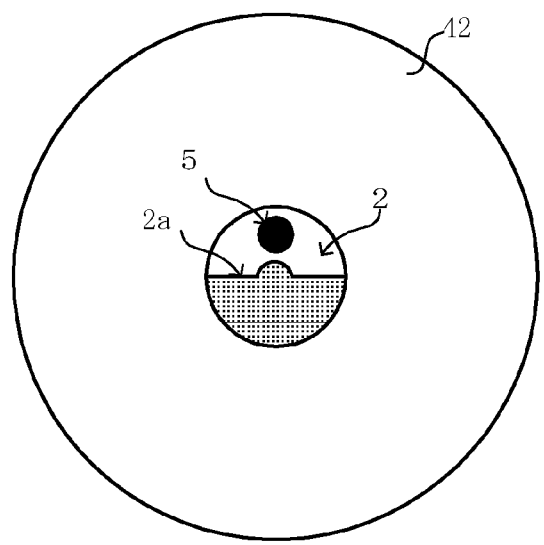
Figure 7:
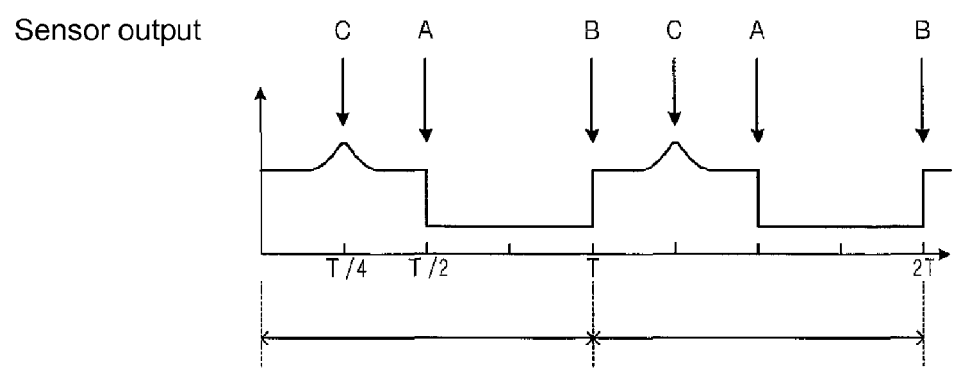
FIG. 7 is a waveform chart showing one example of an output signal of a rotation-sensing gap sensor for the integrated structure of the rotation detection target and the temperature-detection magnetic segment.

FIGS. 6A and 6B show the other example where the rotor-temperature detection section is incorporated in the rotation detection section. Specifically, the temperature-detection magnetic segment 5 is provided in the target member 2 provided with the rotation-detection step 2a.

In this example, a rotation-sensing gap sensor (not shown) is operable to sense an inductance change in the step 2a so as to detect a rotational position of the rotor assembly to identify the motor magnetic pole position, and sense an inductance change in the magnetic segment 5 so as to detect a rotor temperature.

In the example illustrated in FIG. 6, the same waveform as that in FIG. 7 is obtained from a sensor signal from the rotation-sensing gap sensor.

In the 5-axis control-type magnetic bearing system illustrated in FIG. 1, when a carrier wave is applied to each of the sensors in the same phase at the same frequency, respective sensor signals from the sensors having the same structure will have the same carrier component. For example, when each of the X1-axis sensor 30a, the X2-axis sensor 30b, the Y1-axis sensor 30c and the Y2-axis sensor 30d is composed of a sensor having the same structure, a difference between respective sensor signals from a pair of opposed sensor elements in each of the sensors is calculated. Further, a sensor signal from the thrust position sensor (Z-axis sensor) is subjected to a difference operation, for example, with a reference signal. Thus, a sensing process for the radial position sensor is different from that for the thrust position sensor, and therefore a sensor signal of the X1-axis, X2-axis, Y1-axis or Y2-axis sensor is different in phase from that of the Z-axis sensor, in many cases.

Thus, as to a sensor signal of the Z-axis sensor, the A/D converter 110 can sample the sensor signal in synchronization with positive peak positions (i.e., positive peak amplitude values) of a carrier component thereof. In contrast, sensor signals from the X1-axis, X2-axis, Y1-axis and Y2-axis sensors having the same structure are input into the A/D converter 110 in the same phase. Therefore, it is impossible to sample the entire sensor signals in synchronization with positive peak positions or negative peak positions (i.e., negative peak amplitude values) of a carrier component thereof For example, if a sensor signal from the X1-axis sensor is sampled in synchronization with positive peak positions of a carrier component thereof, and a sensor signal from the Y1-axis sensor is sampled in synchronization with negative peak positions of the carrier component, sensor signals of the X2-axis and Y2-axis sensors have to be sampled at phase positions out of the positive and negative peak positions of the carrier component to cause deterioration in S/N ratio.

Figure 8:
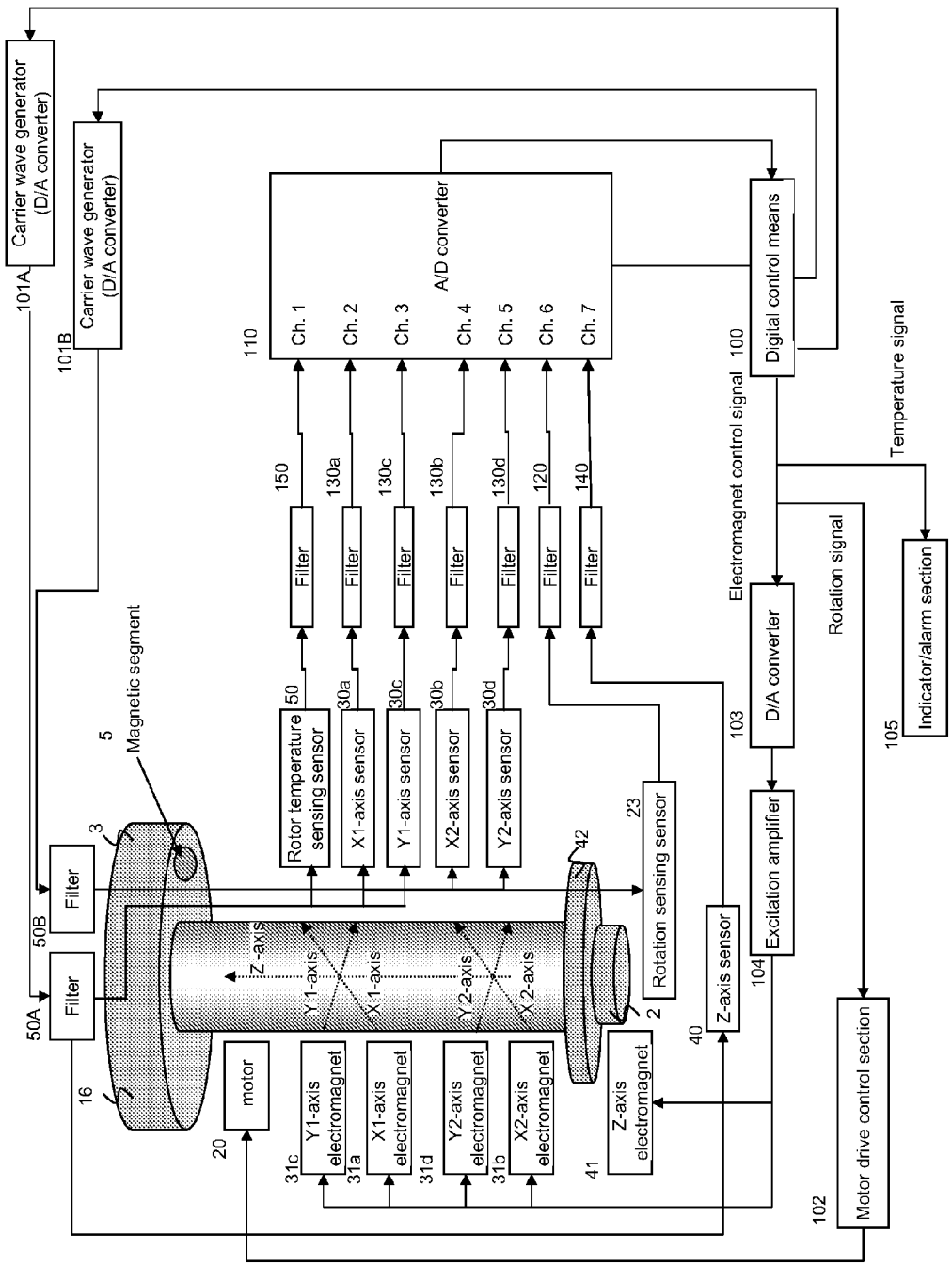
FIG. 8 is a block diagram showing a first circuit configuration designed to sample a sensor signal in synchronization with a positive or negative peak position of a carrier wave, in a magnetic bearing system according to the present invention.
Figure 9:
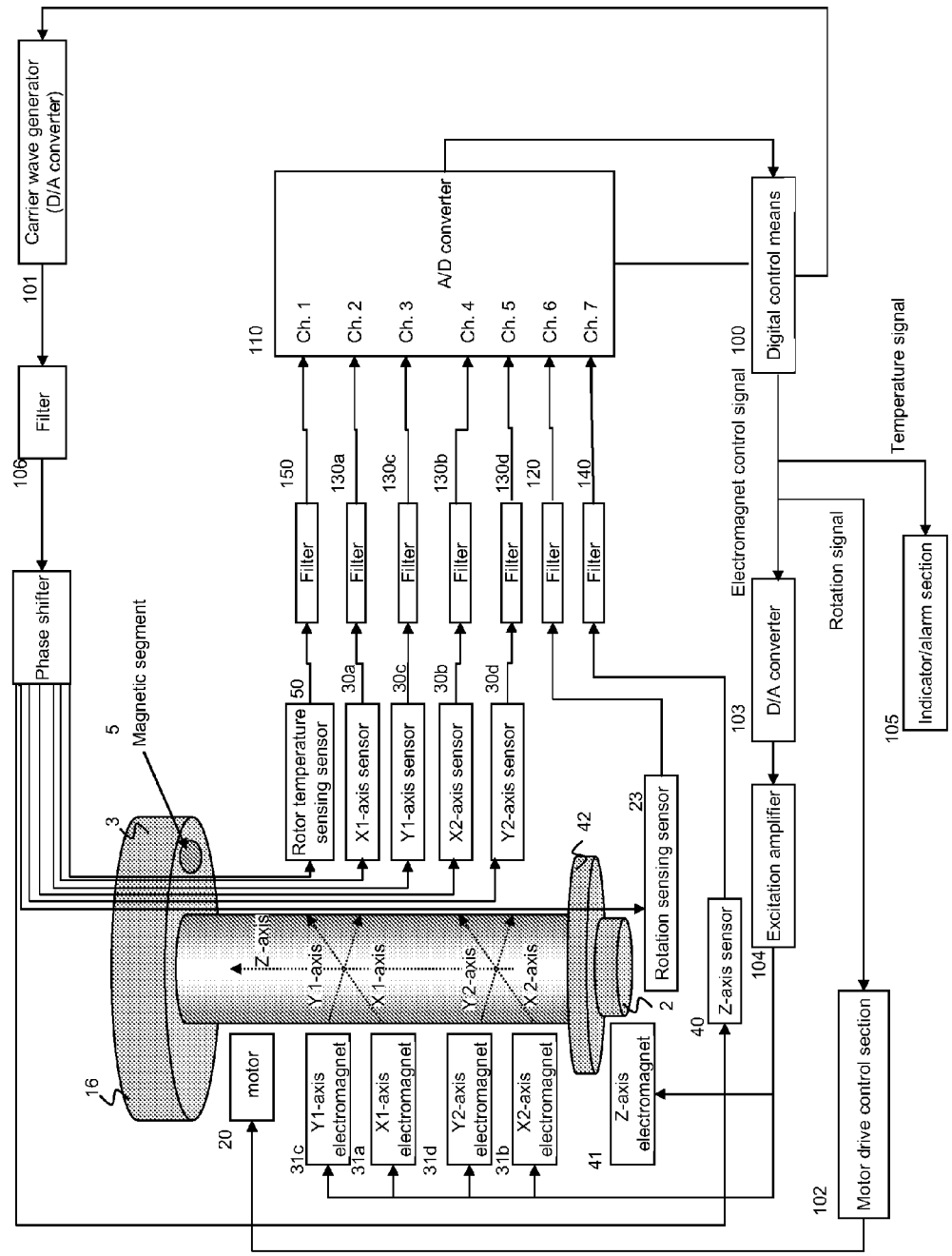
FIG. 9 is a block diagram showing a second circuit configuration designed to sample a sensor signal in synchronization with a positive or negative peak position of a carrier wave, in a magnetic bearing system according to the present invention.
Figure 10:
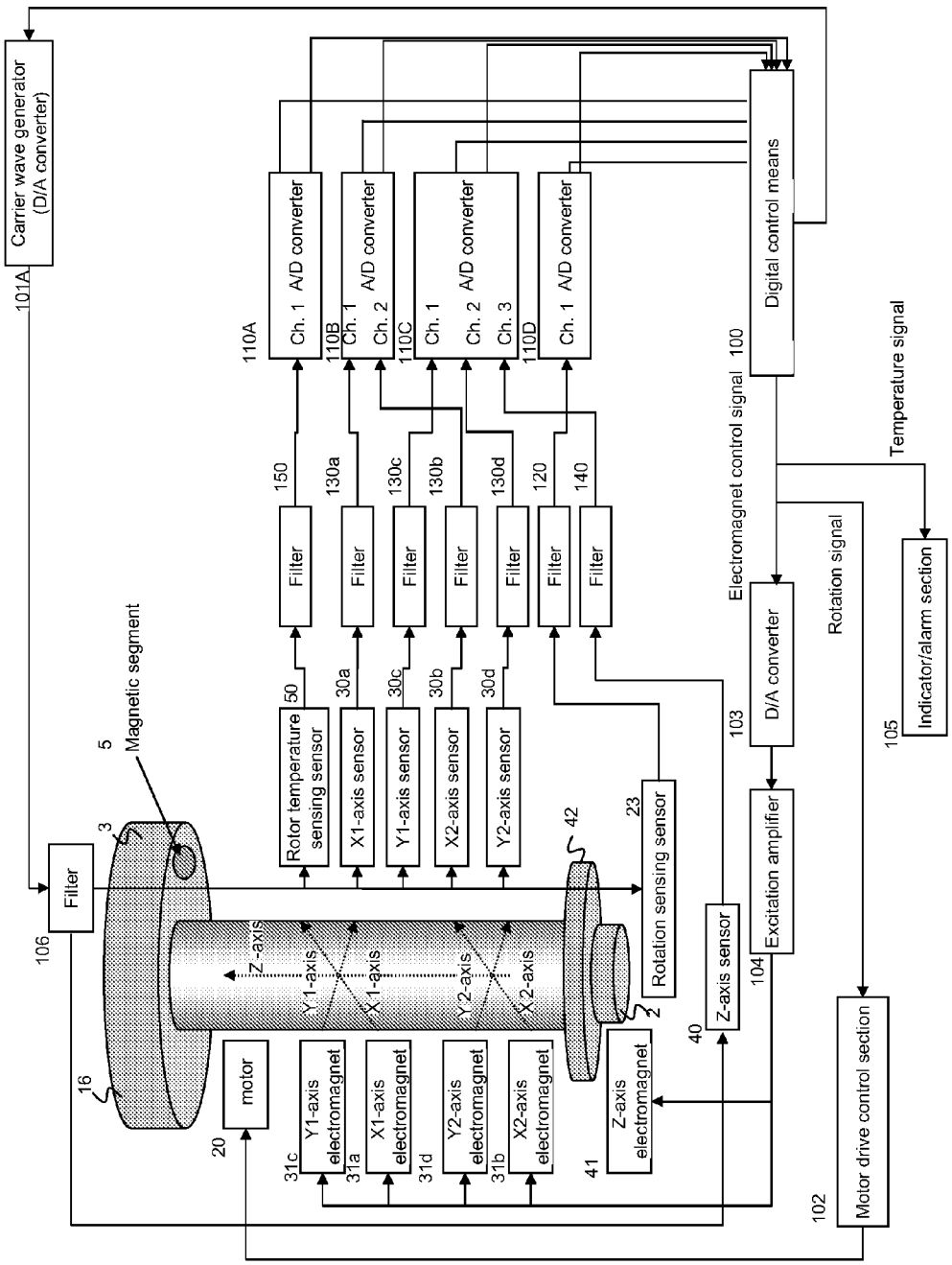
FIG. 10 is a block diagram showing a third circuit configuration designed to sample a sensor signal in synchronization with a positive or negative peak position of a carrier wave, in a magnetic bearing system according to the present invention.

With reference to FIGS. 8 to 10, a circuit configuration (first to third circuit configurations) designed to sample sensor signals in synchronization with positive or negative peak positions of a carrier wave so as to solve the above problem will be described.

The first and second circuit configurations are designed to apply a plurality of carrier wave signals each having a different phase to each of the sensors.

For this purpose, the first circuit configuration comprises a plurality of carrier wave generators. FIG. 8 shows one example of the first circuit configuration. In this example, two carrier generators 101A, 101B are formed using two D/A converters to generate two different carrier waves. Specifically, the two carrier wave generators 101A, 101B are operable to receive a sinusoidal discrete sequence from the digital control means and generate two carrier waves each having a different phase.

A sinusoidal wave output from the carrier wave generator 101A is sent to each of the Z-axis sensor 40, the X1-axis sensor 30a, the Y1-axis sensor 30c and the rotor temperature-sensing sensor 50, through a filter 50A. A sinusoidal wave output from the carrier wave generator 101B is sent to each of the rotation-sensing sensor 23, the X2-axis sensor 30b and the Y2-axis sensor 30d, through a filter 50B.

In this process, respective carrier wave components of the X1-axis and Y1-axis sensors have the same phase, and respective carrier wave components of the X2-axis and Y2-axis sensors have the same phase. However, the carrier wave components in the group of X1-axis, Y1-axis and Z-axis sensors are different in phase from those in the group of X2-axis and Y2-axis sensors. For example, the A/D converter 110 samples sensor signals from seven channels in order of channel numbers (e.g., in order from a channel No. 1 to a channel No. 7 or from the channel No. 7 to the channel No. 1, in such a manner as to sample each of the sensor signals from the X1-axis and Y1-axis sensors in synchronization with positive peak positions of the carrier wave components thereof, and sample each of the sensor signals from the X2-axis and Y2-axis sensors in synchronization with negative peak positions of the carrier wave components thereof. The sensor signal from the Z-axis sensor having a phase out of those of the sensor signals from the X1-axis and Y1-axis sensors can be sampled in synchronization with positive or negative peak positions of the carrier wave component thereof, independently.

Further, the sensor signals from the rotor temperature-sensing sensor 50 and the rotation-sensing sensor 23 each having a different phase can also be sampled in synchronization with positive or negative peak positions of each of the carrier wave components thereof, independently.

A combination of the carrier wave generators and the sensors is not limited to the pattern in FIG. 8, but they may be combined with each other in any other suitable manner.

The second circuit configuration is designed to generate a plurality of carrier waves each having a different phase, by means of phase shifting. FIG. 9 shows one example of the second circuit configuration. In this example, an output from a single carrier generator 101 is input into a phase shifter 107 which is operable to generate a plurality of carrier waves each having a different phase.

An amount of phase shifting in the phase shifter 107 is set to allow the A/D converter 110 to sample respective sensor signals input thereinto, in synchronization with positive or negative positions of carrier wave components thereof. In FIG. 10, it is not essential to apply carrier signals each having a different phase, respectively, to all the X1-axis, X2-axis, Y1-axis and Y2-axis sensors. For example, a first common carrier wave may be applied to the X1-axis and Y1-axis sensors, while applying a second common carrier wave having a different phase from that of the first carrier wave to the X2-axis and Y2-axis sensors.

The third circuit configuration is designed to sample respective sensor signals in synchronization with positive or negative positions of carrier wave components thereof, by use of a plurality of A/D converters.

As shown in FIG. 10, an A/D converter 110A is operable to sample a sensor signal from the rotor temperature-sensing sensor 50 in synchronization with a carrier wave, and an A/D converter 110B is operable to sample a sensor signal from each of the X1-axis and X2-axis sensors 30a, 30b in synchronization with the carrier wave. Further, an A/D converter 110C is operable to sample a sensor signal from each of the Y1-axis, Y2-axis and Z-axis sensors 30c, 30d, 40 in synchronization with the carrier wave, and an A/D converter 110D is operable to sample a sensor signal from the rotation-sensing sensor 23 in synchronization with the carrier wave.

With reference to FIGS. 11 to 15, measures for suppressing instability in magnetic bearing control due to a temperature rise of the rotor assembly will be described.

As the measures for suppressing instability in magnetic bearing control due to a temperature rise of the rotor assembly, the above magnetic bearing system according to the present invention may be designed to change a loop gain of a magnetic bearing control circuit depending on a rotor temperature signal indicative of the detected rotor temperature and/or a cumulative operation time of the vacuum pump operated when the rotor is in a high-temperature state (i.e., cumulative high-temperature operation time). Alternatively, the magnetic bearing system may be designed to change a sensor sensitivity depending on the rotor temperature signal.

As to the former magnetic bearing system according to a first aspect of the present invention, a first control strategy for changing a loop gain of the magnetic bearing control circuit depending on the rotor temperature signal will be described with reference to FIGS. 11 to 12B, and a second control strategy for changing a loop gain of the magnetic bearing control circuit depending on the cumulative high-temperature operation time will be described with reference to FIGS. 13 to 14B. As to the latter magnetic bearing system according to a first aspect of the present invention, a control strategy designed to change a sensor sensitivity depending on the rotor temperature signal will be described with reference to FIGS. 15 and 16.

The first control strategy for changing a loop gain of the magnetic bearing control circuit depending on the rotor temperature signal will be firstly described below.

Figure 11:
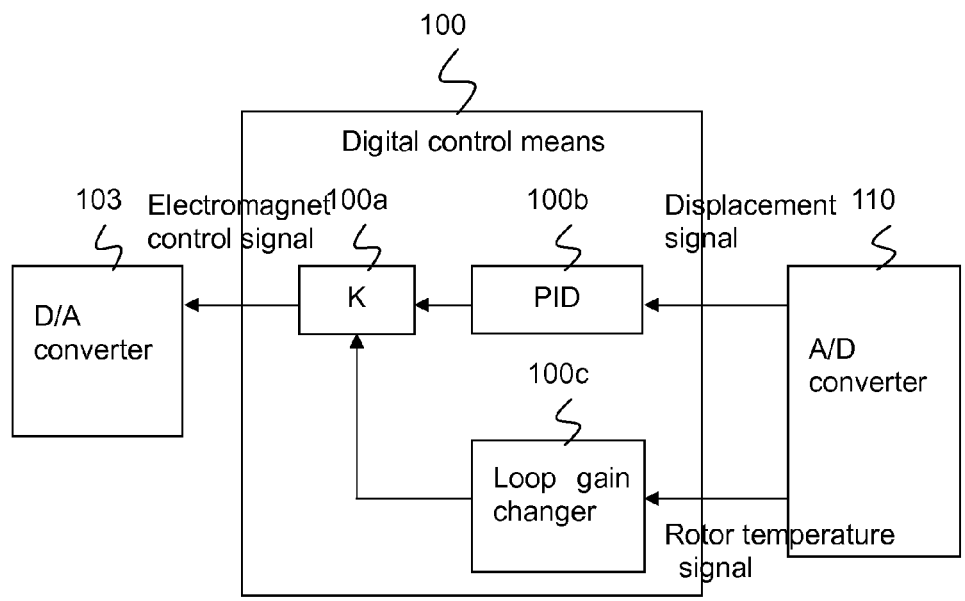
FIG. 11 is a block diagram showing a first control strategy for the magnetic bearing system according to a first aspect of the present invention.

FIG. 11 is a block diagram showing the first control strategy, wherein an improvement of the digital control means 100 in FIG. 1 is primarily illustrated. A digital control means 100 comprises an amplifier section 100a and a PID (Proportional Integral Derivative) control section 100b which constitute a magnetic bearing control circuit. The PID control section 100b is operable to receive a displacement signal from the A/D converter 110 and subject the displacement signal to a proportional control, an integral control, a derivative control and others, and the amplifier section 100a is operable to multiply a signal obtained in the PID control section 100b, by a gain K so as to generate an electromagnet control signal.

In addition to the above conventional elements for the magnetic bearing control circuit, the digital control means 100 in the first control strategy includes a loop gain changer 100c. The loop gain changer 100c is operable to receive a rotor temperature signal from the A/D converter 110 and change the gain K depending on the rotor temperature signal.

Figure 12A:
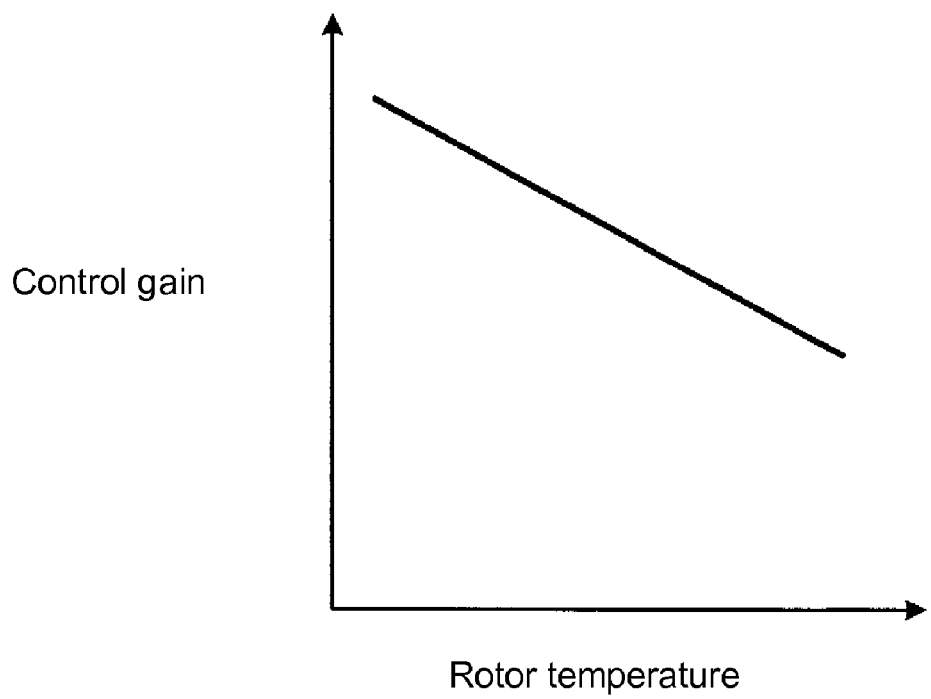
FIGS. 12A and 12B are graphs showing an example of a control gain to be changed in the first control strategy for the magnetic bearing system according to the first aspect of the present invention.
Figure 12B:
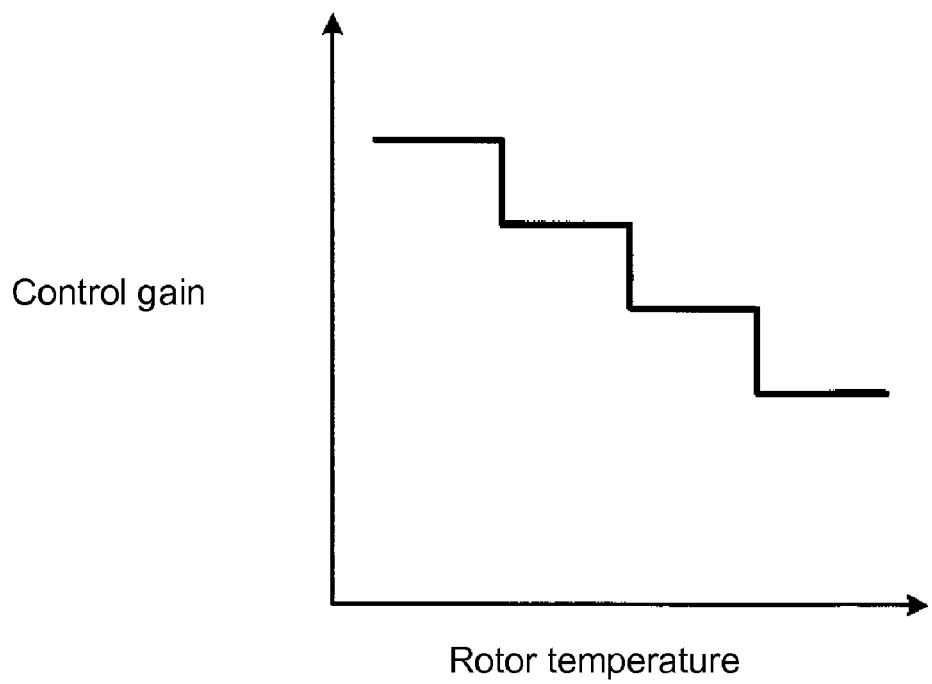

FIGS. 12A and 12B show an example of a characteristic curve for use in changing a control gain in the first control strategy, wherein the horizontal axis represents a rotor temperature, and the vertical axis represents a control gain. FIG. 12B is a characteristic curve for use in changing the control gain stepwise with respect to the rotor temperature (horizontal axis). Each of the characteristic curves is set to change the control gain with a negative inclination relative to the rotor temperature. This makes it possible to controllably lower the control gain along with an increase in temperature of the rotor assembly so as to suppress the occurrence of instability in the magnetic bearing control due to excessive increase in the control gain.

The second control strategy for changing a loop gain of the magnetic bearing control circuit depending on the cumulative high-temperature operation time will be described below.

Figure 13:
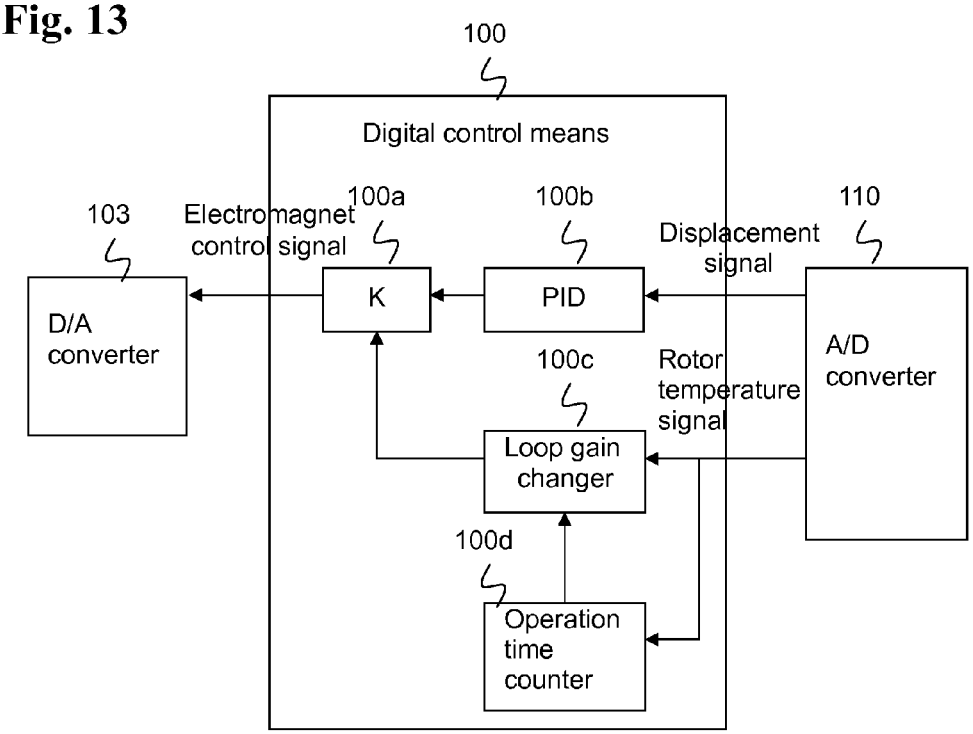
FIG. 13 is a block diagram showing a second control strategy for the magnetic bearing system according to the first aspect of the present invention.

FIG. 13 is a block diagram showing the second control strategy, wherein an improvement of the digital control means 100 in FIG. 1 is primarily illustrated. A digital control means 100 comprises an amplifier section 100a and a PID control section 100b which constitute a magnetic bearing control circuit, as with the first strategy. In addition to the above conventional elements for the magnetic bearing control circuit, the digital control means 100 in the second control strategy includes a loop gain changer 100c for changing a gain K of the amplifier section 100a, and a cumulative operation time counter 100d. The cumulative operation time counter 100d is operable to receive the rotor temperature signal from the A/D converter 110 and cumulatively add an operation time of the vacuum pump operated under a condition that the rotor temperature is greater than a predetermined temperature. The loop gain changer 100c is operable to change the gain K to be set in the amplifier section 100a, depending on the cumulative operation time added by the cumulative operation time counter 100d.

Instead of the operation of changing the loop gain depending on only the cumulative operation time added by the cumulative operation time counter 100d, the loop gain changer 100c may be designed to receive the rotor temperature signal from the A/D converter 110 and change the loop gain depending on a combination of the rotor temperature signal and the cumulative operation time.

Figure 14A:
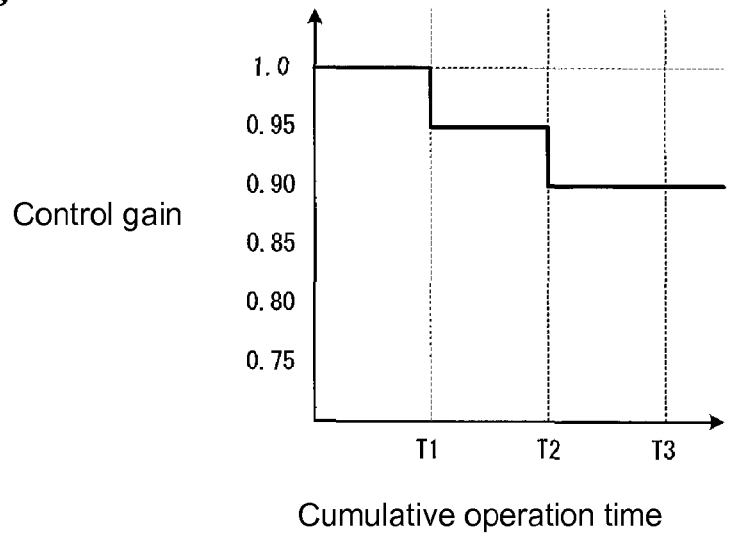
FIGS. 14A and 14B are graphs showing an example of a control gain to be changed in the second control strategy for the magnetic bearing system according to the first aspect of the present invention.
Figure 14B:
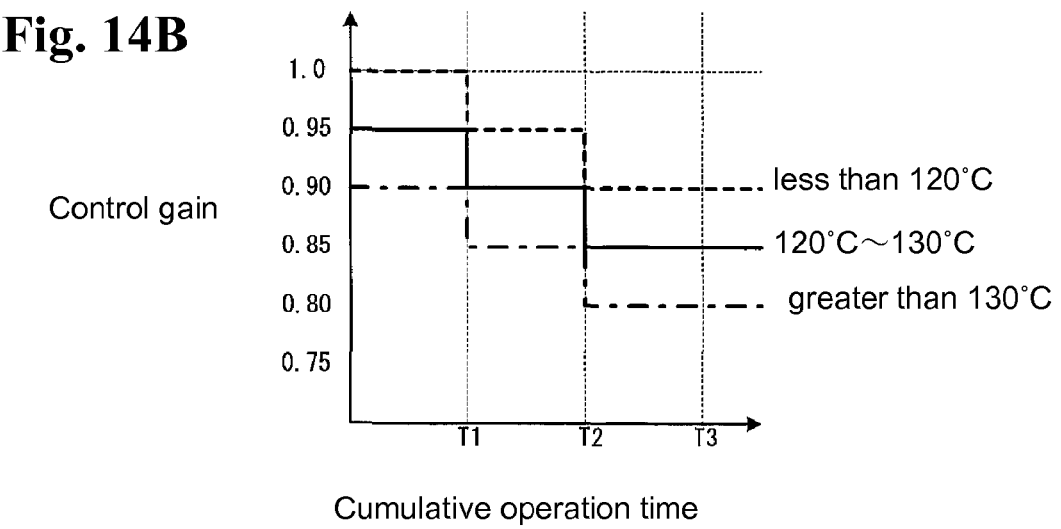

FIGS. 14A and 14B show an example of a characteristic curve for use in changing a control gain in the second control strategy, wherein the horizontal axis represents a cumulative operation time, and the vertical axis represents a control gain. FIG. 14A is a characteristic curve for use in changing the control gain stepwise every time the rotor temperature becomes greater than each of a plurality of predetermined cumulative operation times. FIG. 14B is a characteristic curve for use in changing the control gain stepwise depending on the combination of the rotor temperature signal and the cumulative operation time. Each of the characteristic curves is set to change the control gain with a negative inclination relative to the cumulative operation time.

According to the characteristic curve illustrated in FIG. 14A, when the cumulative operation time is less than T1, the control gain is set to "1". When the cumulative operation time is in the range of T1 to T2, the control gain is set to "0.95". Further, when the cumulative operation time is greater than T2, the control gain is set to "0.9".

The characteristic curve of FIG. 14B is designed to allow the control gain to be set additionally depending on various rotor temperature conditions. For example, the characteristic curve includes a first curve (indicated by the broken line in FIG. 14B) for the condition where the rotor temperature is less than 120° C.; a second curve (indicated by the broken line in FIG. 14B) for the condition where the rotor temperature is in the range of 120 to 130° C.; and a third curve (indicated by the one-dot chain line in FIG. 14B) for the condition where the rotor temperature is greater than 130° C.

For example, under the condition that the rotor temperature is less than 120° C., when the cumulative operation time is less than T1, in the range of T1 to T2, and greater than T2, the control gain is set to "1", "0.95" and "0.9", respectively. Under the condition that the rotor temperature is in the range of 120 to 130° C., when the cumulative operation time is less than T1, in the range of T1 to T2, and greater than T2, the control gain is set to "0.9", "0.85" and "0.8", respectively.

Table 1 shows one example of control gains in the second strategy using both the rotor temperature and the cumulative operation time as parameters.

TABLE 1

| Cumulative Operation Time (Hr) | Rotor Temperature | | |
| --- | --- | --- | --- |
| | less than 120° C. | 120 to 130° C. | greater than 130° C. |
| 0 to 1000 | 1 | 0.95 | 0.9 |
| 1000 to 2000 | 0.95 | 0.9 | 0.85 |
| 2000 to 3000 | 0.9 | 0.85 | 0.8 |

The above values of the control gains have been tentatively set for the sake of explanation, and the present invention is not limited to these control gains.

The control strategy for the magnetic bearing system according to the second aspect of the present invention is designed to change a sensor sensitivity depending on the rotor temperature signal.

Figure 15:
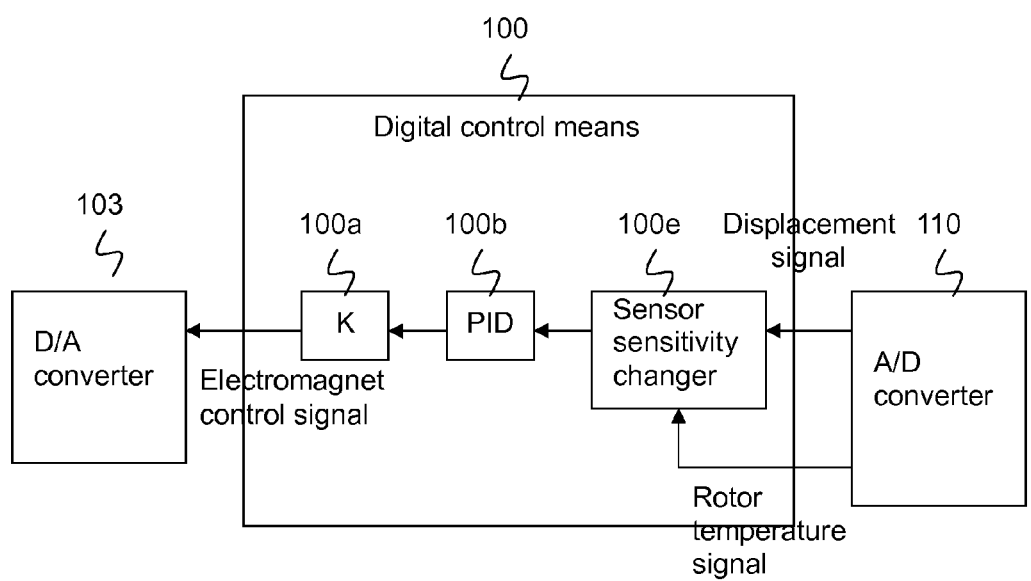
FIG. 15 is a block diagram showing a control strategy for a magnetic bearing system according to a second aspect of the present invention.

FIG. 15 is an explanatory block diagram showing this control strategy, wherein an improvement of the digital control means 100 in FIG. 1 is primarily illustrated. A digital control means 100 comprises an amplifier section 100a and a PID control section 100b which constitute a magnetic bearing control circuit, as with the aforementioned first and second strategies. In addition to the above conventional elements for the magnetic bearing control circuit, the digital control means 100 in this control strategy includes a sensor sensitivity changing section 100e. This sensor sensitivity changing section 100e is operable, in response to receiving the displacement signal and the rotor temperature signal from the A/D converter 110, to change a level of the received displacement signal depending on the rotor temperature signal and send the changed displacement signal to the PID control section 100b.

Figure 16:
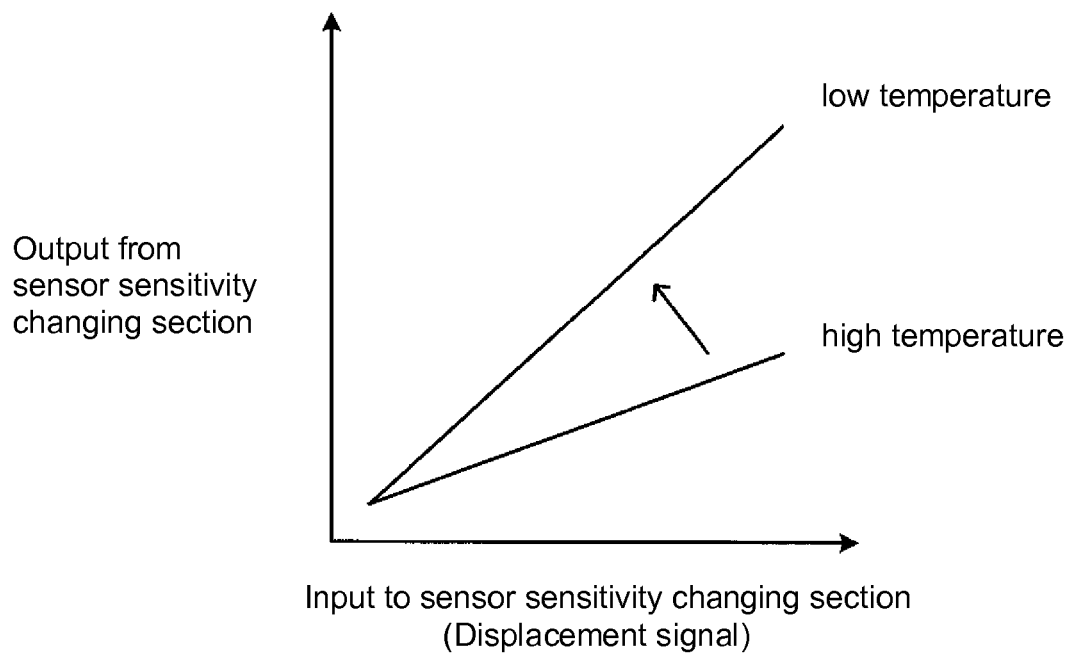
FIG. 16 is a graph showing an example of a control gain to be changed in the control strategy for the magnetic bearing system according to the second aspect of the present invention.

Specifically, the sensor sensitivity changing section 100e is operable, when the rotor temperature is relatively low, to change the level of the received displacement signal to a higher level and output the changed displacement signal, and, when the rotor temperature is relatively high, to change the level of the received displacement signal to a lower level and output the changed displacement signal. FIG. 16 shows one example of a characteristic curve for use in changing a control gain in this strategy.

This makes it possible to controllably lower the control gain along with an increase in temperature of the rotor assembly so as to suppress the occurrence of instability in the magnetic bearing control due to excessive increase in the control gain.

Preferably, in the above loop gain change control based on the digital control means 100, a threshold for changing the control gain is pre-set for each of the first sensor group (X1-axis and Y1-axis sensors) and the second sensor group (X2-axis and Y2-axis group) and the Z-axis sensor by pre-measuring the rotor temperature and the sensor sensitivity for each of the sensors.

An advantageous embodiment of the invention has been shown and described. It is obvious to those skilled in the art that various changes and modifications may be made therein without departing from the spirit and scope thereof as set forth in appended claims.

What is claimed is:

1. A magnetic bearing system for use in a vacuum pump designed to suck and discharge gas according to a rotation of a rotor provided with a rotary blade, comprising:
   a rotary shaft rotationally holding said rotor;
   a motor for rotationally driving said rotary shaft;
   a magnetic levitation section for supporting said rotor relative to a stator through said rotary shaft in a non-contact manner;
   a rotation detection section for detecting a rotational speed of said rotor;
   a rotor-temperature detection section for detecting a temperature of said rotor;
   a carrier-wave generation section for supplying a common carrier wave to each of a plurality of sensors provided in said magnetic levitation section, said rotation detection section and said rotor-temperature detection section; and
   an A/D conversion section for sampling a sensor signal output from each of said sensors, in synchronization with said carrier wave.

2. The magnetic bearing system as defined in claim 1, wherein:
   said magnetic levitation section includes an electromagnet for magnetically levitating said rotor relative to said stator through said rotary shaft to support said rotor in a non-contact manner, and a levitated position-sensing gap sensor for sensing an inductance change which varies depending on a levitated position of said rotor relative to said stator;
   said rotation detection section includes a rotation-sensing gap sensor for sensing inductance changes caused by temperature, a gap change, and the like in a rotation-detection target mounted relative to said rotor; and
   said rotor-temperature detection section includes a rotor temperature-sensing gap sensor for sensing an inductance change caused by a temperature change of a temperature-detection magnetic segment mounted relative to said rotor, said temperature-detection magnetic segment having a Curie temperature approximately equal to an allowable upper-limit temperature of a rotor component of said rotor,
   wherein:
   each of said levitated position-sensing gap sensor, said rotation-sensing gap sensor and said rotor temperature-sensing gap sensor is operable to modulate the carrier wave supplied from said carrier-wave generation section, in association with the inductance change sensed thereby; and
   said A/D conversion section is operable to sample the modulated signal from each of the gap sensors, in synchronization with said carrier wave.

3. The magnetic bearing system as defined in claim 2, wherein said rotation-detection target and said temperature-detection magnetic segment are mounted relative to said rotor at respective positions with a predetermined phase relationship, wherein said magnetic bearing system is designed to identify the position of said temperature-detection magnetic segment, based on the inductance change in the sensor signal output from said rotation-sensing gap sensor.

4. The magnetic bearing system as defined in claim 3, wherein said motor is a brushless DC motor having a permanent magnet, wherein said magnetic bearing system is designed, based on a relative phase relationship between a phase position of said rotation-detection target and a magnetic pole position of said permanent magnet of said motor, to identify said magnetic pole position from the sensor signal from said rotation-sensing gap sensor, and create a motor drive current.

5. The magnetic bearing system as defined in claim 2, wherein said motor is a brushless DC motor having a permanent magnet, wherein:
   said rotary shaft includes a magnetic-segment mounting member mounting therein said temperature-detection magnetic segment and having a step at a position corresponding to a magnetic pole position of said permanent magnet of said motor;
   said rotor temperature-sensing gap sensor is operable to sense both the inductance change caused by the temperature of said temperature-detection magnetic segment and an inductance change caused by a gap change of said step; and
   said rotor-temperature detection section is operable to additionally serve as said rotation detection section.

6. The magnetic bearing system as defined in claim 1, which includes a control section adapted to receive a displacement signal from said A/D conversion section and output a control signal to said magnetic levitation section so as to form a magnetic bearing control circuit, said control section being operable to change a loop gain of said magnetic bearing control circuit depending on a rotor temperature signal indicative of said detected rotor temperature.

7. The magnetic bearing system as defined in claim 6, wherein said control section is operable to change the loop gain according to a characteristic curve with a negative inclination relative to said rotor temperature signal.

8. The magnetic bearing system as defined in claim 1, which includes a control section adapted to receive a displacement signal from said A/D conversion section and output a control signal to said magnetic levitation section so as to form a magnetic bearing control circuit, and provided with a counter for cumulatively adding an operation time of said vacuum pump operated under a condition that said detected rotor temperature is greater than a predetermined temperature, said control section being operable to change a loop gain of said magnetic bearing control circuit depending on a cumulative operation time added by said counter.

9. The magnetic bearing system as defined in claim 8, wherein said control section is operable to change the loop gain according to a characteristic curve with a negative inclination relative to said cumulative operation time.

10. The magnetic bearing system as defined in claim 1, which includes a control section adapted to receive a displacement signal from said A/D conversion section and output a control signal to said magnetic levitation section so as to form a magnetic bearing control circuit, and provided with a counter for cumulatively adding an operation time of said vacuum pump operated under a condition that said detected rotor temperature is greater than a predetermined temperature, said control section being operable to change a loop gain of said magnetic bearing control circuit, depending on a rotor temperature signal indicative of said detected rotor temperature and a cumulative operation time added by said counter.

11. The magnetic bearing system as defined in claim 1, which includes a control section adapted to receive a displacement signal from said A/D conversion section and output a control signal to said magnetic levitation section so as to form a magnetic bearing control circuit, said control section being operable to change a level of said displacement signal depending on a rotor temperature signal indicative of said detected rotor temperature.

12. The magnetic bearing system as defined in claim 11, wherein said control section is operable to change the displacement signal according to a characteristic curve with a negative inclination relative to said rotor temperature signal.

13. The magnetic bearing system as defined in claim 2, which includes a control section adapted to receive a displacement signal from said A/D conversion section and output a control signal to said magnetic levitation section so as to form a magnetic bearing control circuit, said control section being operable to change a loop gain of said magnetic bearing control circuit depending on a rotor temperature signal indicative of said detected rotor temperature.

14. The magnetic bearing system as defined in claim 2, which includes a control section adapted to receive a displacement signal from said A/D conversion section and output a control signal to said magnetic levitation section so as to form a magnetic bearing control circuit, and provided with a counter for cumulatively adding an operation time of said vacuum pump operated under a condition that said detected rotor temperature is greater than a predetermined temperature, said control section being operable to change a loop gain of said magnetic bearing control circuit depending on a cumulative operation time added by said counter.

15. The magnetic bearing system as defined in claim 2, which includes a control section adapted to receive a displacement signal from said A/D conversion section and output a control signal to said magnetic levitation section so as to form a magnetic bearing control circuit, and provided with a counter for cumulatively adding an operation time of said vacuum pump operated under a condition that said detected rotor temperature is greater than a predetermined temperature, said control section being operable to change a loop gain of said magnetic bearing control circuit, depending on a rotor temperature signal indicative of said detected rotor temperature and a cumulative operation time added by said counter.

16. The magnetic bearing system as defined in claim 2, which includes a control section adapted to receive a displacement signal from said A/D conversion section and output a control signal to said magnetic levitation section so as to form a magnetic bearing control circuit, said control section being operable to change a level of said displacement signal depending on a rotor temperature signal indicative of said detected rotor temperature.

17. The magnetic bearing system as defined in claim 3, which includes a control section adapted to receive a displacement signal from said A/D conversion section and output a control signal to said magnetic levitation section so as to form a magnetic bearing control circuit, said control section being operable to change a loop gain of said magnetic bearing control circuit depending on a rotor temperature signal indicative of said detected rotor temperature.

18. The magnetic bearing system as defined in claim 3, which includes a control section adapted to receive a displacement signal from said A/D conversion section and output a control signal to said magnetic levitation section so as to form a magnetic bearing control circuit, and provided with a counter for cumulatively adding an operation time of said vacuum pump operated under a condition that said detected rotor temperature is greater than a predetermined temperature, said control section being operable to change a loop gain of said magnetic bearing control circuit depending on a cumulative operation time added by said counter.

19. The magnetic bearing system as defined in claim 3, which includes a control section adapted to receive a displacement signal from said A/D conversion section and output a control signal to said magnetic levitation section so as to form a magnetic bearing control circuit, and provided with a counter for cumulatively adding an operation time of said vacuum pump operated under a condition that said detected rotor temperature is greater than a predetermined temperature, said control section being operable to change a loop gain of said magnetic bearing control circuit, depending on a rotor temperature signal indicative of said detected rotor temperature and a cumulative operation time added by said counter.

20. The magnetic bearing system as defined in claim 3, which includes a control section adapted to receive a displacement signal from said A/D conversion section and output a control signal to said magnetic levitation section so as to form a magnetic bearing control circuit, said control section being operable to change a level of said displacement signal depending on a rotor temperature signal indicative of said detected rotor temperature.

* * * * *